United States Patent [19]

Maida

[11] 4,436,396

[45] Mar. 13, 1984

[54] ELECTROFLASH UNIT

[75] Inventor: Osamu Maida, Tokyo, Japan

[73] Assignee: Nippon Kogaku K.K., Tokyo, Japan

[21] Appl. No.: 501,545

[22] Filed: Jun. 8, 1983

Related U.S. Application Data

[63] Continuation of Ser. No. 358,836, Mar. 16, 1982, abandoned.

[30] Foreign Application Priority Data

Mar. 23, 1981 [JP] Japan .................................. 56-40505
Mar. 23, 1981 [JP] Japan .................................. 56-40503

[51] Int. Cl.³ ............................................ G03B 15/05
[52] U.S. Cl. ................................. 354/416; 354/145.1;
354/127.12; 315/241 P
[58] Field of Search ............................. 354/27, 32–35,
354/60 F, 60 R, 60 L, 60 E, 53, 31, 127, 128,
139, 145, 149; 315/241 P, 151; 323/318,
349–351

[56] References Cited

U.S. PATENT DOCUMENTS

| 4,021,824 | 5/1977 | Uchiyama et al. | 354/33 |
| 4,086,582 | 4/1978 | Kiyohara et al. | 354/33 |
| 4,363,542 | 12/1982 | Kondo et al. | 354/33 X |
| 4,371,243 | 2/1983 | Takishima et al. | 354/139 X |
| 4,395,100 | 7/1983 | Kondo | 354/33 |

*Primary Examiner*—William B. Perkey
*Attorney, Agent, or Firm*—Shapiro and Shapiro

[57] ABSTRACT

In an electroflash unit attachable to a camera provided with a circuit for measuring light transmitted through a photographing lens, a signal by which TTL flash output control circuit on the camera's side can be actuated is generated. The electroflash unit comprises;
(1) a terminal for connection to the camera
(2) a circuit for effecting flashing
(3) a circuit for terminating said flashing in accordance with the output from said light measuring circuit on the camera and
(4) a circuit for generating, on said terminal, a predetermined signal by which said light measuring circuit is brought into the state ready for operation.

28 Claims, 3 Drawing Figures

ELECTROFLASH UNIT

This is a continuation of U.S. application Ser. No. 358,836 filed on Mar. 16, 1982, now abandoned.

BACKGROUND OF THE INVENTION

1. Field of the Invention

The present invention relates to a camera and an electroflash unit attachable to it.

2. Description of Prior Art

Various signals are transmitted from a camera to an electroflash unit attached thereto, and vice versa. The electroflash unit performs some functions in accordance with the signals transmitted thereto from the camera. The camera performs some functions in accordance with the signals transmitted thereto from the electroflash unit. However, electroflash units according to the prior art are unsatisfactory in transmission and reception of such signals for the following reasons:

In recent years, there has been widely employed an automatic flash output control system so-called TTL flash output control system for flashlight photographing with an electroflash device. In the known TTL flash output control system, the flashlight reflected by the film surface within the camera is received and measured by a photo-detector disposed within the camera. The current related to the received flashlight is integrated and the integrated voltage is compared with a reference voltage. The electroflash unit terminates flashlight emission at the moment when the integrated voltage and the reference voltage are in a predetermined relationship to each other.

The integrating circuit required for integrating the above light quantity and the reference voltage source for producing the above reference voltage may be provided on the camera or on the electroflash unit. However, at least the photo-detector and the circuit associated with the photo-detector are always provided on the camera according to the prior art. For the purpose of power saving it is preferable that the power supply to such circuit provided on the camera's side for TTL flash output control should be cut off excepting the time of flashlight photographing in TTL flash output control mode. However, if TTL flash output control circuit is normally kept in such a non-powered state, then a problem occurs in that when flashlight photographing is actually carried out, the photographer sometimes forgets to supply power to the circuit resulting in failure of the flashlight photographing.

On the other hand, the photographer may forget to turn the power source of the electroflash unit on after mounting the unit on the camera. In this case, he may fail to catch a good shutter chance or may erroneously carry out non-flashlight photographing for an object which should be taken with flashlight. In the latter case, the result is an improper exposure. Further, in case of the conventional electroflash unit, often the photographer may forget to turn the flash unit's power source off after the end of flashlight photographing and thereby the power souce battery is consumed in vain.

SUMMARY OF THE INVENTION

Accordingly it is an object of the present invention to provide a novel arrangement of an electroflash unit which transmits signals to the camera on which the flash unit is mounted and receives signals from the camera.

It is another object of the invention to provide an electroflash unit which generates a signal by which TTL flash output control circuit provided on the camera's side can be actuated, and also to provide a camera useful together with the electroflash unit.

The electroflash unit attaining these objects has the advantage that at all other times than the time of flashlight photographing the power is saved in the camera on which the flash unit is mounted, and at the time of flashlight photographing the circuit for TTL flash output control can be brought into operation automatically.

It is a further object of the invention to provide an electroflash unit which automatically is placed in a powered state when it receives a signal from the camera's side.

The electroflash unit of the present invention is powered only when it is detected that power is being supplied to the camera. Therefore it has the advantage that there is eliminated such failure of flashlight photographing caused by the operator's forgetting the turn-ON its power source switch. Another advantage of the electroflash unit is found in that it can be operated in a very simple manner. In addition, the present invention has the effect of preventing waste of electric power which is otherwise caused by the operator's forgetting the turn-OFF the power source switch.

Other and further objects, features and advantages of the invention will appear more fully from reading the following detailed description of preferred embodiments taken in connection with the accompanying drawings.

DETAILED DESCRIPTION OF PREFERRED EMBODIMENT

A preferred embodiment of the present invention will be described in detail with reference to the accompanying drawings.

For purposes of this specification, the terms "electrical shutter control mode", "mechanical shutter control mode", "flashlight photographing mode", "TTL (through the lens) flash output control mode", "camera interlocking external flash output control mode" and "independent external flash output control mode" as used herein are defined as follows:

Electrical shutter control mode: a mode in which the shutter time is electrically controlled.

Mechanical shutter control mode: a mode in which the shutter time is mechanically controlled by means of a mechanical governor.

Flashlight photographing mode: a mode in which the shutter is automatically set to a flash synchronous time according to the signal from the electroflash device.

TTL flash output control mode: a mode in which the flashlight reflected by the object and transmitted through the objective lens of the camera is measured by a photo-detector mounted in the camera and the flashlight emission of the flash device is terminated by a signal dependent on the flash output measured.

Camera interlocking external flash output control mode:

a mode in which various exposure factors such as film sensitivity and diaphragm aperture then set on the camera's side are introduced into the electroflash device from the camera and the flash light emission is terminated depending on these exposure factors as well as the photometric output of the photo-detector on the side of electroflash device.

Independent external flash output control mode: a mode in which data of exposure factors such as film sensitivity and diaphragm aperture are introduced directly into the flash device and the flashlight emission is terminated depending on these given data as well as the photometric output of the photo-detector on the side of the electroflash device.

By the term "flash synchronous time" as used herein is meant such shutter time which is the maximum speed or a little lower speed than the maximum among all shutter times at which the shutter can be completely opened.

Figure 1:
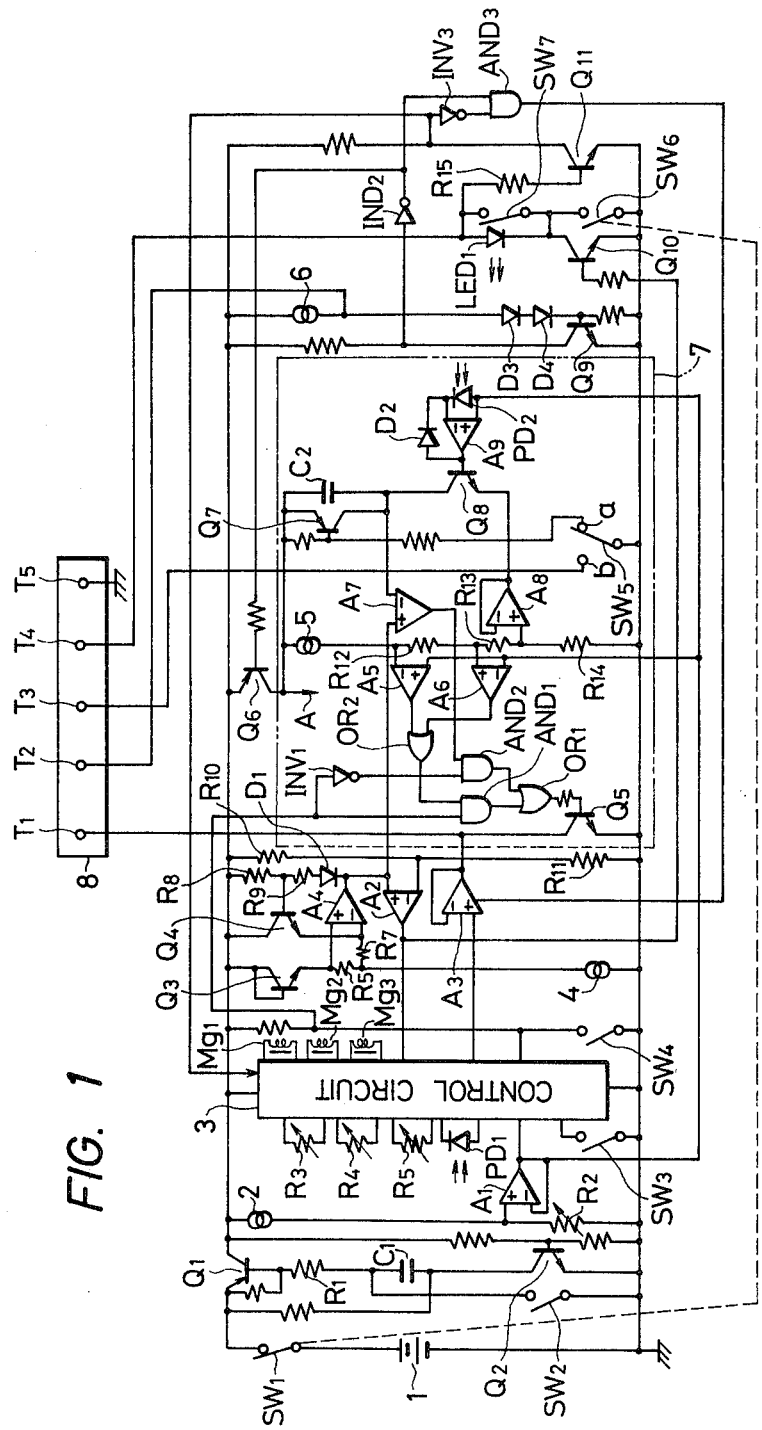
FIG. 1 shows an electrical circuit of a camera provided with a signal transmission and reception apparatus according to the invention.

FIG. 1 shows an electric circuit used in a single lens reflex camera according to the invention.

1 is a power source on the camera's side. A mode change-over switch $SW_1$ is series-connected to the power source 1. The mode change-over switch $SW_1$ is connected with a mode change-over member not shown. When the mode change-over member is moved to set the electrical shutter control mode, the switch $SW_1$ is closed. When the mechanical shutter control mode is set by the mode change-over member, the switch $SW_1$ is opened in link with the movement of the member.

$SW_2$ is a power supply switch interlocked with a shutter release button not shown. When the shutter release button is pushed down over the first half stroke, the power supply switch $SW_2$ is closed. By closing the switch $SW_2$ a power source timer circuit composed of transistors $Q_1$ and $Q_2$, resistor $R_1$ and capacitor $C_1$ is brought into operation. Power supply to the circuit on the camera's side is effected through the transistor $Q_1$ which is turned on by closing the power supply switch $SW_2$. When the switch $SW_2$ is opened, charging of the capacitor $C_1$ is started. The transistor $Q_1$ can remain conductive, namely On for a time determined by the time constant of capacitor $C_1$ and resistor $R_1$. After this predetermined holding time has been passed, the transistor $Q_1$ becomes Off. In this manner, the power source timer circuit $Q_1$, $Q_2$, $R_1$, $C_1$ supplies power to the circuit in the camera not only during the switch $SW_2$ being closed but also continues the power supply for the predetermined constant time after the switch $SW_2$ is opened so long as the change-over switch $SW_1$ is in the closed position. A temperature-compensated constant current from a constant current source 2 flows into a variable resistor $R_2$. The voltage produced at the both ends of the variable resistor $R_2$ has a characteristic which is proportional to absolute temperature. The resistance value of this variable resistor $R_2$ is variable depending on the set value of film sensitivity and produces a voltage corresponding to Apex value of film sensitivity. This film sensitivity voltage is transmitted to a control circuit 3 through a follower amplifier $A_1$. The control circuit 3 has various known functions such as shutter priority automatic exposure control, diaphragm priority automatic exposure control, programmed automatic exposure control, manual exposure control, automatic change-over of the shutter time to flash synchronous time for flashlight photographing mode, display of controlled exposure value, electromagnetic releasing etc. A variable resistor $R_3$ is interlocked with a shutter dial not shown. The function of the variable resistor $R_3$ is to introduce into the control circuit 3 the shutter time manually set for shutter priority automatic exposure control or manual exposure control. $R_4$ is a variable resistor interlocked with the setting motion of diaphragm aperture of the taking lens. The resistance value of variable resistor $R_5$ corresponds to the fully open, namely minimum F-number of the taking lens.

$PD_1$ is a photo-detector which is so disposed that it can receive the light transmitted through the camera lens when the quick return mirror in the camera is in its lowered position and it can not receive the light when the mirror is moved upward. The outputs from these elements $R_4$, $R_5$ and $PD_1$ are all introduced into the control circuit 3. $SW_3$ is a release switch which is closed when the shutter release button is pushed down over the second half stroke subsequent to the above mentioned first half stroke. In response to the closing of this switch $SW_3$, the control circuit 3 drives a release magnet Mg1. With this driving of the release magnet, a series of exposure operations well known in the art of single-lens reflex camera are initiated. For instance, stopping down of the diaphragm, rising of the quick return mirror, opening of the shutter etc. are successively performed.

$SW_4$ is a memory switch interlocked with the shutter releasing motion. The memory switch $SW_4$ is closed immediately before the incident light to the photo-detector $PD_1$ is blocked and opened when the blockage against the incident light is removed. During the time when the memory switch $SW_4$ is in the closed position, a memory circuit within the control circuit 3 memorizes the output value of the object illuminance from the photo-detector $PD_1$ at the closing of the switch or the computed exposure value resulting from the object illuminance and values of other exposure factors. For the above described automatic exposure control, the exposure control is carried out on the basis of this stored value in the memory.

Mg2 is a magnet for controlling the shutter closing operation. For electrical shutter control mode, the magnet Mg2 causes the shutter to start closing by an output from the control circuit 3. Mg3 is a diaphragm controlling magnet which controls the aperture diameter of the diaphragm for the taking lens.

Constant current source 4, resistors $R_6$, $R_7$, $R_8$, $R_9$, transistors $Q_3$ and $Q_4$, diode $D_1$ and operational amplifier $A_4$ constitute together a reference voltage source stable against variations in temperature and source voltage. The manner of operation of this reference voltage source is as follows:

The current of constant current source 4 is divided into transistors $Q_3$ and $Q_4$ in accordance with the ratio of resistance $R_6$ to $R_7$ owing to the negative feedback operation of the operational amplifier $A_4$. Making use of the fact that the voltage at the base-emitter stage of transistors $Q_3$ and $Q_4$ depends on the current density at the junction between base and emitter, there is produced between the connection point of resistor $R_9$ and diode $D_1$ and the positive line of the power source 1 a voltage having a positive temperature coefficient proportional to the absolute temperature. This voltage cancels out the negative temperature coefficient of the voltage produced at the diode $D_1$. At the output of the operational amplifier $A_4$, therefore, a stable reference voltage is obtained the temperature coefficient of which is zero. In the case where in the diode $D_1$ is a silicon diode, the reference voltage output is in the order of 1.2 V. Connected to the output terminal of the reference voltage source, that is, the output terminal of the operational amplifier $A_4$ is the (+) input, namely the noninverting terminal, of a battery checking comparator $A_2$ whose (−) input namely, the inverting terminal, is connected to the connection point of voltage dividing resistors $R_{10}$ and $R_{11}$ for dividing the voltage of the power source 1. The output of the comparator $A_2$ is at high level (High) when the voltage of the power source 1 is at a level sufficient enough to normally operate the camera. When the voltage of the power source 1 is lower than the level, the output of the battery checking comparator $A_2$ becomes low level (Low). When the output of the comparator $A_2$ is Low, the control circuit 3 inhibits the display of exposure control value and also locks the shutter release to give a warning of drop in voltage of the power source 1.

$A_3$ is a follower amplifier which is operating only when the output of a gate $AND_3$ shown in the right-hand edge of FIG. 1 is High. In this position, the information data of exposure factors, film sensitivity and diaphragm aperture value are transmitted to a terminal $T_1$ of an accessory shoe 8 as described later from the control circuit 3 through the follower amplifier $A_3$. When the output of gate $AND_3$ is Low, the follower amplifier $A_3$ becomes inoperative and the transmission of the exposure factor information data is blocked.

A block 7 enclosed by the dotted line is TTL flash output control circuit to which current is supplied from a power supply transistor $Q_6$. For purpose of simplification of the drawing, only some chief elements of the circuit elements in the block 7 are shown connected to the transistor $Q_6$ in FIG. 1. The arrow A in the block 7 suggests that the transistor $Q_6$ is to be connected to other circuit elements in the block 7. In the TTL flash output control circuit 7 a flashlight measuring photo-detector $PD_2$ shown as a photo diode is disposed to receive the light reflected upon the film plane. An operational amplifier $A_9$ and a diode $D_2$ form a logarithmic compression circuit of the photo current from the photo-detector $PD_2$. Since the output of film sensitivity is also applied to the logarithmic compression circuit from the follower amplifier $A_1$, the output from the circuit $A_9$, $D_2$ is a composite value resultant from reflected light upon the film plane and film sensitivity. A logarithmic expansion transistor $Q_8$ has base terminal connected to the output of the logarithmic compression circuit $A_9$, $D_2$, emitter terminal connected to the output of a follower amplifier $A_8$, and collector terminal to an integrating capacitor $C_2$. The logarithmic expansion transistor $Q_8$ produces, as its collector current, such current as given by logarithmically expanding the output from the logarithmic compression circuit $A_9$, $D_2$. The follower amplifier $A_8$ generates, as reference voltage, a voltage proportional to the absolute temperature through a temperature compensated constant current source 5 and a resistor $R_{14}$. Parallel-connected to the integrating capacitor $C_2$ is a transistor $Q_7$ which is turned off in response to full opening of the shutter to start charging the capacitor $C_2$. The turn-Off of this transistor $Q_7$ is effected by the switch-over of synchro-switch $SW_5$ from contact a to b in synchronism with the full opening of the shutter.

$A_7$ is a comparator for forming a TTL flash output control signal. This comparator $A_7$ compares the integrated output from the integrating capacitor $C_2$ with the reference voltage from the above described reference voltage source $A_4$, $Q_3$, $Q_4$, $R_6$–$R_9$, $D_1$. When the integrated output and the reference voltage have just reached a predetermined relationship, the comparator $A_7$ issues a TTL flash output control signal to terminate flashlight emission. In this manner, the reference voltage source $A_4$, $Q_3$, $Q_4$, $R_6$–$R_9$, $D_1$ is used as a common reference voltage to the battery checking comparator $A_2$ and the flash output control signal forming comparator $A_7$. While the output from the amplifier $A_4$ has been shown to be directly applied to the comparators $A_2$ and $A_7$ as the reference voltage for comparison, it is to be understood that the present invention is not limited to such embodiment shown in FIG. 1 only. As the reference input there may be used also a divided voltage of the output of the amplifier $A_4$.

For TTL flash output control mode it is generally difficult to attain a proper and correct flash output control under the conditon in which the set film sensitivity is extremely high or extremely low. This difficulty is attributable to the limitations imposed on the circuit. To detect whether or not the set film is within the range for proper control there is provided the following detection means:

A pair of comparators $A_5$ and $A_6$ constitute a circuit for discriminating whether or not the set film sensitivity is suitable for TTL flash output control. The temperature compensated constant current source 5 and series-connected resistors $R_{12}$–$R_{14}$ constitute a reference voltage source proportional to the absolute temperature. The reference voltage source applies a relatively high reference voltage to one input terminal of the comparator $A_5$ and a relatively low reference voltage to one input terminal of the other comparator $A_6$ respectively. The comparator $A_5$ compares the film sensitivity output of the follower amplifier $A_1$ with the relatively high reference voltage and produces a High level output when the set film sensitivity is over the upper limit of the above mentioned proper range. The other comparator $A_6$ makes a comparison between the film sensitivity output of the follower amplifier $A_1$ and the relatively low reference voltage and generates a High level output when the set film sensitivity is under the lower limit of the proper range. In this manner it is detected by the pair of comparators $A_5$ and $A_6$ whether the film sensitivity is within the proper range or not. If not, then the output of gate $OR_2$ becomes High which serves as a film sensitivity warning signal. The output of gate $OR_2$ is applied to OR gate $OR_1$ through AND gate $AND_1$ and the output of the comparator $A_7$ is applied to the gate $OR_1$ through AND gate $AND_2$. These AND gates $AND_1$ and $AND_2$ are alternatively opened. Thus, when the memory switch $SW_4$ is open, the gate $AND_1$ is opened and when the switch $SW_4$ is closed the other gate $AND_2$ is opened through inverter $INV_1$. Transistor $Q_5$ is controlled by the output of the gate $OR_2$ when the switch $SW_4$ is open and controlled by the output of the comparator $A_7$ when the switch is closed.

The above mentioned accessory shoe 8 of the camera has five terminals $T_1$–$T_5$. The circuit on the camera's side is connected with an electroflash unit attached to the shoe 8 through these terminals $T_1$–$T_5$. Of these five terminals the terminal $T_1$ is connected to the transistor $Q_5$ and to the follower amplifier $A_3$ for transmitting the exposure factor data signal relating to film sensitivity and diaphragm aperture value. The data signal, flash output control signal and film sensitivity warning signal are alternatively transmitted to the electroflash device through the terminal $T_1$. The second terminal $T_2$ receives a signal informing of whether the electroflash device is in TTL flash output control mode or not. The terminal $T_2$ has also another function to transmit a discrimination signal to the electroflash unit. The discrimination signal is a signal informing of whether the camera is in mechanical shutter control mode or in electrical shutter control mode. The third terminal $T_3$ is connected to the contact b of synchro-switch $SW_5$ so as to transmit a flash start signal from the camera to the electroflash unit. The fourth terminal $T_4$ receives from the electroflash unit a signal informing the completion of charging the main capacitor of the flash unit, a flash synchronous time setting signal for changing over the shutter to the flash synchronous time, and other warning signals. The fifth terminal $T_5$ is a grounded terminal.

Constant current source 6, diodes $D_3$, $D_4$ and transistor $Q_9$ constitute together a TTL flash output control discriminating circuit for discriminating whether the electroflash unit now mounted on the camera is in TTL flash output control mode or not. The connection point between the constant current source 6 and the diode $D_3$ is connected to the terminal $T_2$ to receive TTL output control mode signal from the electroflash unit. The collector of transistor $Q_9$ is connected to the base of power supply transistor $Q_6$ through inverter $INV_2$ so that the transistor $Q_6$ is turned on to supply current to TTL control circuit 7 only when the TTL flash output control mode discriminating circuit 6, $D_3$, $D_4$, $Q_9$ judges the mode as TTL flash output control mode. A light emitting diode $LED_1$ is connected, at its anode, to the terminal $T_4$. This diode $LED_1$ is disposed within the finder of the camera to serve as a pilot lamp for displaying the completion of charging the main capacitor in the electroflash unit. When the charging of the main capacitor is completed, a charge completion signal in the form of a large current is supplied to the diode $LED_1$ from the electroflash unit. With this signal, the pilot lamp $LED_1$ lights on to indicate the completion of charging. Connected in series to the pilot lamp $LED_1$ is a transistor $Q_{10}$ which is controlled by the battery checking comparator $A_2$. When the voltage of camera power source 1 is not sufficiently high, the transistor $Q_{10}$ is rendered nonconductive to forcedly turn off the pilot lamp $LED_1$. An interlocking switch $SW_6$ interlocked with the changeover switch $SW_1$ is parallel connected to the transistor $Q_{10}$. The interlocking switch $SW_6$ is closed when the mechanical shutter control mode is selected by the mode change-over member and is opened when the electrical shutter control mode is selected. Parallel connected to the pilot lamp $LED_1$ is a switch $SW_7$ which is turned on only when the shutter time manually set for mechanical shutter control mode is higher in shutter speed than the flash synchronous time. In all other cases, namely in the case where the manually set shutter time is a shutter speed lower than the flash synchronous time or in the case of electrical shutter control mode, the switch $SW_7$ is opened. A flash synchronous time setting transistor $Q_{11}$ forcedly sets the shutter to the flash synchronous time when the electrical shutter control mode is selected. The base of the transistor $Q_{11}$ is connected to the terminal $T_4$ through resistor $R_{15}$ and its collector is connected to the control circuit 3. The flash synchronous time setting transistor $Q_{11}$ is turned on by a flash synchronous time setting signal in the form of a very small current which is supplied to the transistor $Q_{11}$ from the electroflash unit through terminal $T_4$ by turn-On, namely supply of the power source of the flash unit. When the transistor $Q_{11}$ is turned on, the shutter time is forcedly set to the synchronous time controlled by the control circuit 3. At this time, a portion of the very small current flows also in the pilot lamp $LED_1$. However, this portion of the small current is so preselected as to be too small to turn the pilot lamp on. More particularly, when the transistor $Q_{11}$ is turned on, the control circuit 3 controls the shutter in the following procedures:

For diaphragm priority automatic exposure control mode, it sets the shutter time to the flash synchronous time.

For shutter priority automatic exposure control mode or programmed automatic exposure control mode, it sets the shutter time to the flash synchronous time and at the same time it inhibits the magnet $Mg3$ from electrically controlling the diaphragm aperture so as to make it possible to manually set any desired diaphragm value.

For manual exposure control mode, if the manually set shutter time is over the flash synchronous time, then it forcedly changes over the former to the latter. So long as the manually set shutter time is longer than the flash synchronous time, it controls the shutter with the manually set shutter time. In addition, in this case, the control circuit 3 stops the power supply to the circuits associated with automatic exposure control which are unnecessary for manual exposure control, for the purpose of power saving.

Input terminals of AND gate $AND_3$ are connected to collectors of transistors $Q_9$ and $Q_{11}$ through inverters $INV_2$ and $INV_3$ respectively. When both of the transistors $Q_9$ and $Q_{11}$ are rendered conductive, the output of $AND_3$ becomes High to operate the follower amplifier $A_3$ for transmitting exposure factor information signal from the control circuit 3 to the terminal $T_1$. When the follower amplifier $A_3$ is inactive, its output impedance becomes infinite.

The manner of operation of the above described circuit provided on the side of camera is as follows:

(1) Operation in the case wherein an electroflash unit of TTL flash output control mode has been mounted on the camera which is in turn in electrical shutter control mode:

In this case, since the camera is set to electrical shutter control mode, the change-over switch $SW_1$ is closed. By a push-down of the shutter release button up to the first half stroke, the power supply switch $SW_2$ is closed and the power supply transistor $Q_1$ is turned on. In the manner later described in detail with reference to FIG. 2, the electroflash unit supplies to the camera's circuit a small current, that is, the flash synchronous time setting signal through the terminal $T_4$. By this small current the flash synchronous time setting transistor $Q_{11}$ is turned on so that the control circuit 3 sets the shutter time forcedly to the flash synchronous time. The electronic flash unit of TTL flash output control mode clamps down the potential of terminal $T_2$ to a sufficiently low level. Detecting this low level potential at the terminal $T_2$, the TTL flash output control mode discriminating circuit 6, $D_3$, $D_4$, $Q_9$ judges the mode of the electroflash unit to be TTL flash output control mode and renders the output of inverter $INV_2$ Low. More concretely, the output of inverter $INV_2$ is changed to Low by turn-Off of transistor $Q_9$. With the low level output of inverter $INV_2$ the power supply transistor $Q_6$ is turned on to supply power to TTL flash output control circuit 7. In this manner, when there is used an electroflash unit of TTL flash output control mode, the power supply to TTL flash output control circuit 7 on the camera's side is automatically effected. In case of TTL flash output control mode, the electroflash unit need not receive from the camera any exposure factor information signal of film sensitivity and diaphragm aperture. Therefore, the low level output of inverter $INV_2$ changes the output of gate $AND_3$ to Low to make inactive the exposure factor information signal transmitting follower amplifier $A_3$. As soon as the electro flashing unit is ready for flashing, that is to say, as soon as the main capacitor in the flash unit has been charged completely, the flash unit supplies to the camera through the terminal $T_4$ a relatively large current as a charge completion signal. The output of battery checking comparator $A_2$ is High and the transistor $Q_{10}$ is conductive so long as the camera power source 1 is sufficiently high in voltage. Therefore, the charge completion signal turns the pilot lamp $LED_1$ on because of the switches $SW_6$ and $SW_7$ also being open in case of electrical shutter control mode. Naturally, the flash synchronous time setting transistor $Q_{11}$ remians conductive at this time.

In the above described state wherein the shutter release button has been pushed down only over the first half stroke, the memory switch $SW_4$ remains opened. Therefore, the gate $AND_1$ is open and the transistor $Q_5$ is controlled by the output of the gate $OR_2$. In this position of the circuit, if the film sensitivity set at the variable resistor $R_2$ is not suitable for TTL flash output control mode, then either the comparator $A_5$ or $A_6$ has a high level output thereby turning the transistor $Q_5$ on. Turn-On Of this transistor $Q_5$ is transmitted to the electroflash unit through terminal $T_1$ to bring the previous warning circuit built in the flash unit into operation. The warning circuit makes a pulsating current flow into the circuit in the camera through terminal $T_4$ to flicker the pilot lamp $LED_1$. In this manner, if the film sensitivity is not suitable for TTL flash output control mode, there is given a previous warning of it by the flicker of the pilot lamp $LED_1$ prior to taking a picture. The pulsating current mentioned above has a current value so preset as to turn on the synchronous time setting transistor $Q_{11}$ even when the pilot lamp $LED_1$ is turned off. Observing the warning signal, the photographer may give up the intended picturetaking in TTL flash output control mode or may continue it as intended. In the latter case, since the shutter time remains the synchronous time set by the turn-On of transistor $Q_{11}$ even during warning, a flashlight photographing can be carried out. However, there is no assurance of proper exposure in this case.

When the film sensitivity is within the range suitable for TTL flash output control mode, the outputs of comparators $A_5$ and $A_6$ are both Low and transistor $Q_5$ is nonconductive, namely Off. Therefore, no warning as described above is given.

A further push-down of the shutter release button over the second half stroke closes the release switch $SW_3$ to actuate the release magnet Mg 1. Thereby a series of mechanical operations such as stopping-down of the diaphragm aperture, upward movement of the quick return mirror, opening of the shutter etc. are started. The memory switch $SW_4$ is closed immediately before the upward movement of the mirror. In response to the closing of this memory switch $SW_4$, the gate $AND_1$ is closed and the gate $AND_2$ is opened through inverter $INV_1$. Consequently, after the closing of the memory switch $SW_4$, the transistor $Q_5$ is controlled by the output of the flash output control signal forming comparator $A_7$. Before the shutter is fully opened, the synchro-switch $SW_5$ is in contact with the contact a and transistor $Q_7$ is On to short-circuit the integrating capacitor $C_2$. Therefore, the output of the comparator $A_7$ is Low and transistor $Q_5$ is Off. When the shutter is fully opened, the synchro-switch $SW_5$ is switched over from the contact a to b. On this connection of the synchro-switch $SW_5$ to the contact b, the electroflash unit is started flashing through terminal $T_3$. The flashlight reflected upon the film plane is incident on the photo diode $PD_2$. Also, since the transistor $Q_7$ is turned off by the connection of the synchro-switch $SW_5$ to the contact b, the capacitor $C_2$ starts integration by the collector current of transistor $Q_8$ corresponding to the film sensitivity and the incident light on the photo diode $PD_2$. When the integrated voltage reaches the level of the reference voltage of the reference voltage source $Q_3$, $Q_4$, $A_4$, $D_1$, $R_6$–$R_9$, the signal forming comparator $A_7$ issues a high level signal, i.e., a flash output control signal. By this signal the transistor $Q_5$ is turned on to bring into operation a flash terminating circuit in the flash unit through terminal $T_1$. Thus, flashing is terminated. As will be described in detail, the electroflash unit is so formed as to transmit the signal produced at the terminal $T_1$ to the previous warning circuit when the synchro-switch $SW_5$ is in contact with the contact a and transmit the signal to the flash terminating circuit when the switch is in connected to the contact b.

When the shutter is closed the synchro-switch is switched over from contact b to a. Thereby the transistor $Q_7$ is turned on again to discharge the integrating capacitor $C_2$. Thereafter, the quick return mirror moves downward and the memory switch $SW_4$ is opened. From this time, the transistor $Q_5$ is controlled by the output of the discrimination circuit $A_5$, $A_6$, $OR_2$ for judging whether the film sensitivity is proper or not.

If the voltage of camera power source 1 is not sufficiently high, the output of the battery checking comparator $A_2$ becomes Low by which the transistor $Q_{10}$ is turned off to keep the pilot lamp $LED_1$ unlighted. In this manner, if the camera's circuit is not in the position to normally operate, the pilot lamp always remains to be extinguished to prevent flashlight photographing in TTL flash output control mode under such undesirable condition.

When turn-Off of the power supply switch $SW_2$ the power source timer circuit $Q_1$, $Q_2$, $C_1$, $R_1$ starts counting time. A certain predetermined time after the turn-Off of the power supply switch, the power supply transistor $Q_1$ is turned off to cut off power supply to the whole circuit on camera's side. Consequently, the pilot lamp $LED_1$ is always extinguished from this time point.

According to the present invention, the output of the discrimination circuit $A_5$, $A_6$ and that of the signal forming comparator $A_7$ are transmitted to the flash unit from the same terminal $T_1$. To this end, in the shown embodiment, timings of operations on the camera side and on the flash unit side are determined in the following manner:

On the side of camera, the output of the discrimination circuit for judging the suitability of film sensitivity is generated at the terminal $T_1$ before the actuation (closure) of memory switch $SW_4$. The output of the comparator $A_7$ for forming a flash output control signal is generated at the terminal $T_1$ after the actuation of the switch $SW_4$. On the side of the electroflash unit, the signal at the terminal $T_1$ is switched over from previous warning circuit to flash terminating circuit in response to the actuation of synchroswitch $SW_5$ (connection of the switch $SW_5$ to the contact b) which is actuated after the actuation of the memory switch $SW_5$. In this manner, after changing over the signal appearing at the terminal $T_1$, the circuit of the flash unit to receive the signal is changed over. This embodiment is preferable in view of the fact that it is assured that only the output of the flash output control signal forming comparator $A_7$ can be applied to the flash terminating circuit of the flash unit without fail. However, other operational timings may be employed to attain the same purpose. For example, timing for changing over the output from that of the discrimination circuit to that of the signal forming comparator may be determined by the actuation of synchro-switch $SW_5$ in such manner as to make the timing coincident with the timing for switchover from the previous warning circuit to the flash terminating circuit on the side of electroflash unit.

In the embodiment shown in FIG. 1, the suitability of film sensitivity has been detected electrically by use of comparators $A_5$ and $A_6$. However, it is to be understood that the method for judging the suitability of film sensitivity is not limited to such electrical discimination method only and there may be used also mechanical means for the same purpose. For example, there may be used a mechanical switch to detect the set film sensitivity. In this case, the electrical output derived from ON-OFF of the switch is introduced into the gate $AND_1$ in substitution for the output from OR gate $OR_2$ shown in the above embodiment.

(2) Operation in the case wherein an electroflash unit of camera interlocking external flash output control mode has been mounted on the camera which is in turn in electrical shutter control mode:

In this case, since the camera is in electrical shutter control mode, the switches $SW_6$ and $SW_7$ are opened. TTL flash output control discrimination circuit 6, $D_3$, $D_4$, $Q_9$ judges that the mode of the flash unit is, in this case, camera interlocking external flash output control mode. After discrimination the mode, the transistor $Q_9$ becomes conductive, namely on. More concretely, in this case, the electroflash unit does not clamp the potential at terminal $T_2$ into lower potential and therefore the transistor $Q_9$ turned on. By this turn-On of transistor $Q_9$ the output of inverter $INV_2$ is changed to High thereby turning the power supply transistor $Q_6$ off. In this manner, in case of camera interlocking external flash output control mode, no power is supplied to TTL flash output control circuit 7 on camera's side.

With turn-On of the power source of the flash unit, a flash synchronous time setting signal is sent from the flash unit through the terminal $T_4$. By means of the setting signal, the synchronous time setting transistor $Q_{11}$ is turned on. As a result, the control circuit 3 forcedly sets the shutter time to flash synchronous time. Also, as a result of turn-On of $Q_{11}$ the output of inverter $INV_3$ is changed to High. Since, as previously mentioned, the output of inverter $INV_2$ is High at the time, the output from the gate $AND_3$ becomes High. Thereby, the follower amplifier $A_3$ is brought into operation so that the exposure factor information signal of film sensitivity and diaphragm aperture is transmitted to the flash unit from the control circuit 3 through the amplifier $A_3$ and terminal $T_1$.

If the attached electroflash unit has a previous warning function as described above, the information signal transmitted through the terminal $T_1$ is checked as to whether or not the exposure data is within the range of flash output control ability of the flash unit. If it is judged to be beyond the range, then a pulsating current flows to the camera's circuit to flicker the pilot lamp $LED_1$ in the same manner as described above in connection with TTL flash output control mode. Flicker of the pilot lamp $LED_1$ gives the photographer a previous warning to the effect that the combination of set film sensitivity and diaphragm aperture is not suitable for flash output control. Like the case (1), the pulsating current is preset to such value which is sufficient to keep the transistor $Q_{11}$ conductive even when the pilot lamp $LED_1$ is turned off.

By closing the release switch $SW_3$ the shutter is fully opened in the same manner as above and the synchroswitch $SW_5$ is switched over from contact a to b to make the flash unit start flashing. At the same time, integration of the quantity of reflected flashlight is started using a photo receptor element provided in the flash unit. The electroflash unit terminates flashing after a certain predetermined time according to the integrated light quantity and the exposure factor information signal of film sensitivity and diaphragm aperture introduced from the camera's side. If the power supply transistor $Q_1$ is left nonconductive or if the voltage of the camera power source 1 is too low, then the pilot lamp $LED_1$ remains always to be extinguished as described above.

In this manner, when the attached electroflash unit is in camera interlocking external flash output control mode, no power is supplied to TTL flash output control circuit. Information of exposure factors, film sensitivity and diaphragm is automatically introduced into the flash unit.

(3) Operation in the case wherein an electroflash unit of independent external flash output mode has been mounted on the camera which is in turn in electrical shutter control mode:

In this case, the flash unit does not use any exposure factor signal information of film sensitivity and diaphragm aperture from the camera. Instead, the flash unit carries out an independent flash output control operation.

(4) Operation in the case wherein the camera is in mechanical shutter control mode:

When the mechanical shutter control mode is selected, the change-over switch $SW_1$ is opened and therefore there takes place no power supply at all to the side of camera. When the shutter time manually set is longer than the flash synchronous time and the attached electroflash unit is of TTL flash output control mode or camera interlocking external flash output control mode, then the following operations take place:

Since the shutter time is longer than the flash synchronous time, the switch $SW_7$ is open in this case. Also, since no power is supplied to the camera's circuit from the power source 1, TTL flash output control circuit 7 is inactive. Therefore TTL flash output control is impossible. The control circuit 3 and the amplifier $A_3$ are also inactive. An information signal of film sensitivity and diaphragm aperture can not be transmitted to the flash unit from the camera. Therefore, camera interlocking external flash output control is impossible also. The flash unit in TTL flash output control mode will detect the absence of voltage at the terminal $T_2$. The flash unit in camera interlocking external flash output mode will detect the absence of voltage at the terminal $T_1$. In either case, the flash unit brings its own warning circuit into operation in response to the detection. Thereby a pulsating current is supplied to the terminal $T_4$. As mechanical shutter control mode is selected on the camera's side, the switch $SW_6$ is now in its closed position. Therefore, the pulsating current from the flash unit's side is allowed to flow through the pilot lamp $LED_1$ and the switch $SW_6$. Thus, the pilot lamp $LED_1$ flickers, which indicates that neither TTL flash output control nor camera interlocking flash output control is possible.

On the contrary, when an electroflash unit of independent external flash output control mode is mounted on the camera, a charge completion signal is supplied to the camera's side from the flash unit through terminal $T_4$ after completing the charging of the main capacitor in the flash unit. This signal flows through the pilot lamp $LED_1$ and switch $SW_6$ from the terminal $T_4$. Therefore, the pilot lamp $LED_1$ lights up to indicate that the flash unit is ready for flashing.

On the other hand, the camera is provided with a mechanical release mechanism which can be operated by pushing down the shutter release button because mechanical shutter control mode has been selected in this case. With the operation of the mechanical release mechanism, a series of operations such as stopping down the diaphragm, driving the quick return mirror and opening the shutter are performed successively in the same manner as that at the actuation of the release magnet Mg1 described above. When the shutter is fully opened, the synchro-switch $SW_5$ is connected to the contact b to cause flashing of the flash unit. The flashlight reflected by the object is received by a photodetector in the flash unit to control the flashlight emission.

As readily understood from the above, when the mechanical shutter control mode is selected, the mode which can be used for flash is limited to the independent external flash output control mode only. If the mechanical controlled shutter time then selected is shorter the flash synchronous time, then switch $SW_7$ is closed to short-circuit the pilot lamp $LED_1$. Therefore, in this case, the pilot lamp remains extinguished which prevents an erroneous picture-taking with flashlight.

(5) Operation in the case wherein no electroflash unit has been mounted yet on the camera or the power source of the electroflash unit has been supplied even after mounting it on the camera which is in turn in electrical shutter control mode:

In this case, the transistor $Q_9$ is conductive and the synchronous time setting transistor $Q_{11}$ is conductive because the electroflash unit has not been mounted on the camera yet or, even if mounted, its power source is not supplied. Conductivity of the transistor $Q_9$ renders the power supply transistor $Q_6$ nonconductive namely, Off, to inhibit power supply to TTL flash output control circuit 7 for purpose of power saving. Also, since the transistor $Q_{11}$ is nonconductive, the control circuit 3 does not carry out any forced setting of the shutter to the flash synchronous time. The shutter is controlled depending on the measured brightness of the object or on the shutter time manually set at that time. The output of AND gate $AND_3$ is Low because of transistor $Q_{11}$ being nonconductive. The low level output of the gate $AND_3$ makes the amplifier $A_3$ inactive. Consequently, in this case, there is produced no information signal of film sensitivity and diaphragm aperture at the terminal $T_1$.

Hereinafter, a description will be given of an electroflash unit in accordance with the invention used together with the above described camera.

Figure 2:
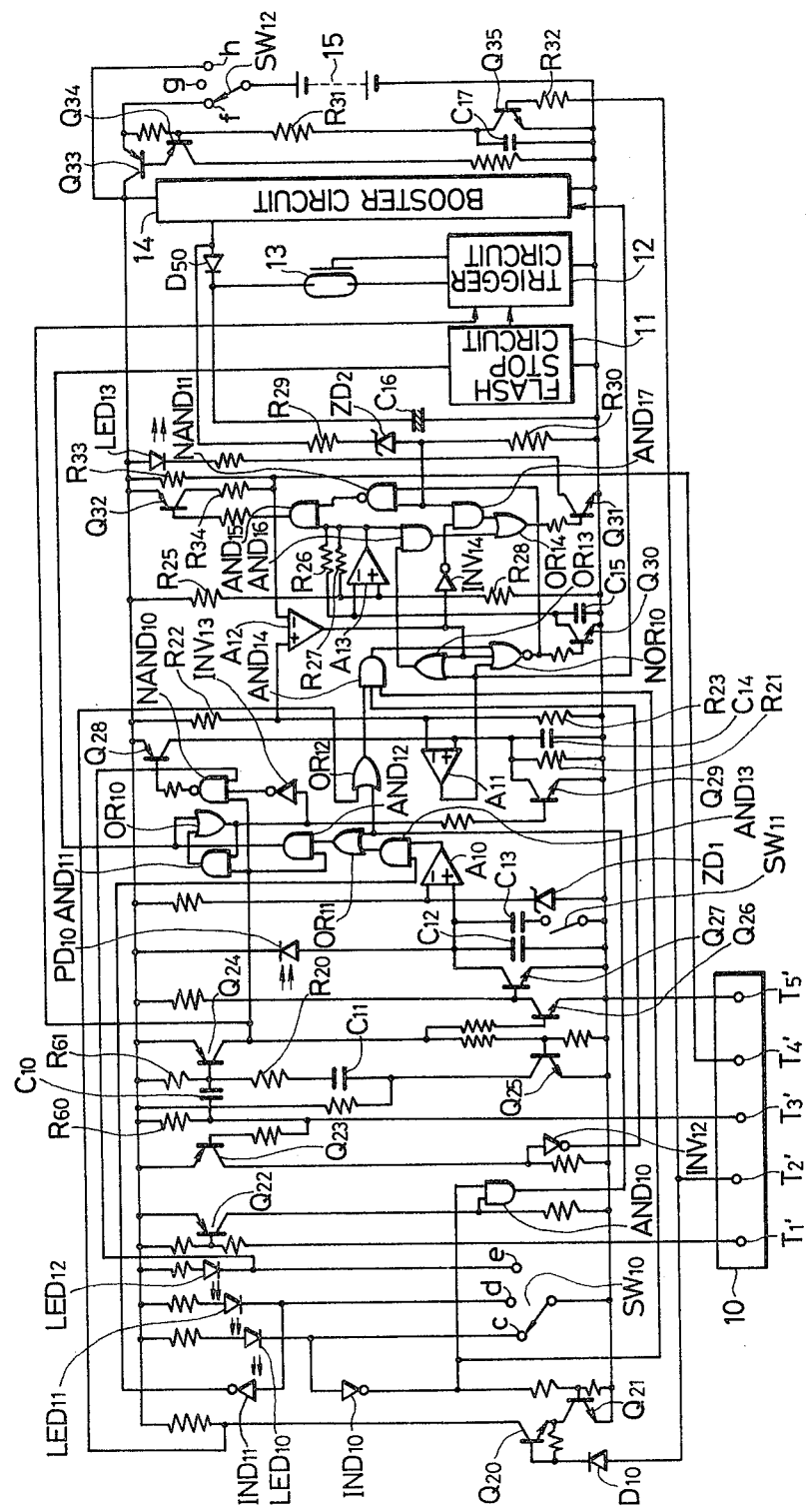
FIGS. 2 and 3 respectively show different embodiments of the electroflash unit provided with the signal transmission and reception apparatus according to the invention and adapted to be mounted on the camera shown in FIG. 1.

FIG. 2 shows an embodiment of electroflash unit according to the present invention. The electroflash unit is so designed as to be operable in any mode selected from the group consisting of TTL flash output control mode, independent external flash output control mode and non-flash output control mode.

The electroflash unit shown in FIG. 2 is provided with a mounting foot 10 having five terminals $T'_1-T'_5$. To mount the flash unit to a camera, the mounting foot 10 is engaged in the above mentioned accessory shoe 8 of the camera. In engagement, the five terminals $T'_1-T'_5$ on the flash unit are connected to the corresponding five terminals $T_1-T_5$ on the camera. Designated by 15 at the right-hand edge of FIG. 2 is a power source for flash unit. Connected in series to the flash unit power source 15 is a power source switch $SW_{12}$ having three contacts f, g and h. When the contact f is selected by the power source switch $SW_{12}$, the power supply to the flash unit is carried out interlocking with the condition of power supply to the camera. This mode is referred to as camera interlocking power source mode. When the contact g is selected, the power supply is not carried out. When the contact h is selected, the power supply to the flash unit is carried out independently of the camera.

Transistors $Q_{33}-Q_{35}$, resistors $R_{31}$, $R_{32}$ and capacitor $C_{17}$ constitute a power supply control circuit. When the camera interlocking power source mode contact f is selected by the power source switch $SW_{12}$, the power supply control circuit detects, through terminals $T_2$ and $T'_2$, whether or not power is being supplied to the camera. If the camera's circuit is in the state of power supply, then the power supply control circuit $Q_{33}-Q_{35}$, $R_{31}$, $R_{32}$ automatically brings the flash unit into the state of power supply. On the contrary, if the camera is in the state of non-power supply, then the control circuit prevents power supply to the flash unit.

14 is a booster circuit for boosting the voltage of the power source 15. A main capacitor $C_{16}$ is charged with the boosted source voltage through diode $D_{50}$. Zener diode $ZD_2$ and resistors $R_{29}$ and $R_{30}$ constitute together a charge completion detecting circuit. When the charge on the main capacitor $C_{16}$ reaches a predetermined level for flashing, the detection circuit detects it. 13 is a flash discharge tube which is flashed by the discharge current from the main capacitor $C_{16}$. 12 is a trigger circuit which causes the discharge tube 13 to start flashing in response to the actuation of the synchro-switch on the camera. The trigger circuit 12 has also another function to terminate the flashlight emission in response to the actuation of a flash terminating circuit 11 which is actuated by means of a flash terminating signal, i.e., flash output control signal. $LED_{13}$ is a pilot lamp formed of a light emitting diode, and is controlled by transistor $Q_{31}$ connected in series to the pilot lamp. $R_{33}$ is a current limiting resistor whose one end is connected to the positive pole of the power source 15 through power source switch $SW_{12}$. The other end of the resistor $R_{33}$ is connected to the terminal $T'_4$. When power is supplied to the flash unit, the current limiting resistor $R_{33}$ supplies a flash synchronous time setting signal, that is, a small current to the transistor $Q_{11}$ of the camera shown in FIG. 1 through terminal $T'_4$, $T_4$. Transistor $Q_{32}$ and resistor $R_{34}$ are connected in series with each other and connected in parallel to the current limiting resistor $R_{33}$. The transistor $Q_{32}$ is controlled by the output of the charge completion detecting circuit $ZD_2$, $R_{29}$, $R_{30}$ through gates $NAND_{11}$ and $AND_{15}$. The transistor $Q_{32}$ is nonconductive before completing the charging of main capacitor $C_{16}$ and it is rendered conductive after completing the charging. When the transistor $Q_{32}$ is turned on, resistors $R_{33}$ and $R_{34}$ and connected in parallel to each other. Therefore, a large current serving as a charge completion signal is supplied to the circuit on the camera through terminal $T'_4$, $T_4$ to light on the pilot lamp $LED_1$ on the camera. Naturally, this large current maintains conductivity of the transistor $Q_{11}$ on the camera.

Resistors $R_{25}$–$R_{28}$, comparator $A_{13}$, capacitor $C_{15}$ and transistor $Q_{30}$ form a warning oscillating circuit which operates when the transistor $Q_{30}$ is rendered nonconductive. In operation, the warning circuit generates an oscillation output of several HZ at the output terminal of comparator $A_{13}$. The oscillation output is applied to the transistor $Q_{31}$ through gates $AND_{16}$ and $OR_{14}$ to control ON-OFF of the transistor $Q_{31}$ with the above mentioned oscillation frequency. Thereby the pilot lamp $LED_{13}$ on the side of flash unit is flickered on one hand. On the other hand, the oscillation output is applied to the transistor $Q_{32}$ through gate $AND_{15}$ to control ON-OFF of $Q_{32}$ with the above oscillation frequency thereby flickering the pilot lamp $LED_1$ on the side of camera.

$A_{12}$ is a comparator for detecting high speed shutter time mechanically controlled. The comparator $A_{12}$ compares the voltage at terminal $T'_4$ with a reference voltage formed by voltage dividing resistors $R_{22}$ and $R_{23}$ to detect that the shutter time set for mechanical shutter control mode is a higher speed shutter time namely shorter than the flash synchronous time. More concretely, in case of electrical shutter control mode, the potential at terminal $T'_4$ is the sum of base-emitter voltage of transistor $Q_{11}$ and voltage of resistor $R_{15}$ as seen in FIG. 1. In case of mechanical shutter control mode and high speed shutter time, the potential at the terminal $T'_4$ is ground potential because of switches $SW_6$ and $SW_7$ being closed. As the reference voltage mentioned above, a value between the above sum and the ground potential is selected. By setting the reference voltage to such level it is assured that the output of comparator $A_{12}$ becomes High only when the shutter time set in mechanical shutter control mode is a higher speed shutter time than the synchronous shutter time and remains Low for all other times. When the comparator $A_{12}$ detects the high speed shutter time and therefore its output becomes High, it closes the gate of $AND_{17}$ through an inverter $INV_{14}$ to disconnect transistor $Q_{31}$ from the output of the charge completion detecting circuit $ZD_2$, $R_{29}$, $R_{30}$ and also to turn transistor $Q_{30}$ off through gate $NOR_{10}$ to thereby bring the warning oscillation circuit $R_{25}$–$R_{28}$, $A_{13}$, $C_{15}$, $Q_{30}$ into operation.

Transistors $Q_{28}$ and $Q_{29}$, comparator $A_{11}$, capacitor $C_{14}$ and resistor $R_{21}$ constitute together a circuit for detecting that flash output control has been unexecuted. When there is produced no flash output control signal during the longest flash time of the attached electroflash unit after start of flashing, the unexecuted flash output control detecting circuit detects it and the output of the comparator $A_{11}$ becomes High for a certain determined time length. By this high level output, that is, an unexecuted flash output control detection signal, AND gate $AND_{16}$ is opened through gate $OR_{13}$ and also transistor $Q_{30}$ is turned off through gate $NOR_{10}$. Therefore, the warning oscillation circuit starts operating. At the same time, the operation of booster is inhibited or suppressed. In this case, the main capacitor $C_{16}$ is completely discharged because no flash output control is executed. Therefore, the output of the charge completion detecting circuit $ZD_2$, $R_{29}$, $R_{30}$ becomes Low by which the gate $AND_{17}$ is closed and the gate $AND_{15}$ is opened through gate $NAND_{11}$. Consequently, when no flash output control was executed, both of the pilot lamps $LED_1$ and $LED_{13}$ continue flickering for a certain predetermined time after the end of flashing.

The divided voltage formed by voltage dividing resistors $R_{22}$ and $R_{23}$ mentioned above is used as a common reference voltage to the comparators $A_{11}$ and $A_{12}$.

Within the electroflash unit a photo diode $PD_{10}$ is disposed to receive the flashlight reflected by the object. When transistor $Q_{27}$ is turned off, an integrating capacitor $C_{12}$ starts to integrate the photo current. An integrating capacitor $C_{13}$ is connected in parallel to the integrating capacitor $C_{12}$ when switch $SW_{11}$ is closed. The switch $SW_{11}$ is opened when the diaphragm of the camera is set at a predetermined value for example f4. It is closed when the diaphragm is stopped down to a predetermined larger diaphragm value for example f8. Therefore, when the predetermined larger diaphragm value is selected, the integration time required for the terminal voltage of condensers $C_{12}$, $C_{13}$ to reach a determined level increases. These elements, photo diode $PD_{10}$, capacitors $C_{12}$, $C_{13}$, transistor $Q_{27}$ and switch $SW_{11}$ constitute a light quantity integrating circuit for independent flash output control mode. In case of the independent flash output control mode, the integrated output of the light quantity integrating circuit $PD_{10}$, $C_{12}$, $C_{13}$, $Q_{27}$, $SW_{11}$ and a reference voltage formed by Zener diode $ZD_1$ are compared each other by a comparator $A_{10}$. When they are in a predetermined relationship to each other, the comparator $A_{10}$ generates a flash output control signal by means of which flashlight emission is terminated. This flash output control signal is applied to a flash terminating circuit 11 through gates $AND_{13}$, $OR_{11}$ and $AND_{12}$.

Capacitor $C_{10}$ and resistors $R_{60}$ and $R_{61}$ constitute a differentiation circuit which is connected to the terminal $T'_3$. When the synchro-switch $SW_5$ of camera is connected to the contact b, the differentiation circuit generates a differentiation pulse. Transistors $Q_{24}$, $Q_{25}$, resistor $R_{20}$ and capacitor $C_{11}$ constitute a monostable multivibrator circuit which is triggered by the differentiation pulse generated from the differentiation circuit $C_{10}$, $R_{60}$, $R_{61}$. When triggered, the monostable circuit produces a high level output at the collector of transistor $Q_{24}$ for a certain time as long as or longer than the maximum flashing time of the electroflash unit. The high level output brings a trigger circuit 12 into operation to start flashing. Also, it turns the transistors $Q_{26}$ and $Q_{27}$ off to start the above mentioned integration of light quantity. Furthermore, the high level output is applied to gates $NAND_{10}$, $AND_{11}$ and $AND_{12}$. The gate $AND_{11}$ forms together with OR gate $OR_{10}$ a latch circuit. The function of this latch circuit $AND_{11}$, $OR_{10}$ is to latch the flash output control signal until the decay of output of the monostable circuit. More particularly, when a flash output control signal is applied to the gate $OR_{10}$ from the gate $AND_{12}$ during the output generation from the monostable circuit, the latch circuit $AND_{11}$, $OR_{10}$ latches the signal until the output of the monostable circuit becomes extinct even if the signal has already disappeared. The output of this latch circuit, that is, the output from the gate $OR_{10}$ is applied to the gate $NAND_{10}$ through inverter $INV_{13}$ on one hand and also used to control transistor $Q_{29}$ on another hand.

$Q_{23}$ is a transistor whose base is connected to the terminal $T'_3$. The transistor $Q_{23}$ is rendered conductive when the synchro-switch $SW_5$ on the camera's side is in contact with the contact b. The output of inverter $INV_{12}$ is turned to High by conductivity of this transistor $Q_{23}$ to close the gate $AND_{14}$. When the synchro-switch $SW_5$ is in connection with the contact a, the transistor $Q_{23}$ is rendered nonconductive by which the gate $AND_{14}$ is opened through inverter $INV_{12}$. The function of this transistor $Q_{23}$ is as follows:

In case of TTL flash output control mode, a signal informing of the suitability of set film sensitivity is transmitted from camera's side to the electroflash unit through terminal $T_1$, $T'_1$ before operating the shutter release. After the shutter release operation, TTL flash output control signal is transmitted to the flash unit from the camera through terminal $T_1$, $T'_1$. The film sensitivity suitability signal has to be introduced into the warning oscillation circuit $R_{25}$-$R_{28}$, $A_{13}$, $C_{15}$, $Q_{30}$. The TTL flash output control signal has to be introduced into the flash terminating circuit 11. This is attained by transistor $Q_{23}$. Before shutter releasing operation, more concretely, during the time of the synchro-switch $SW_5$ being in connection with the contact a, the transistor $Q_{23}$ opens the gate $AND_{14}$ so as to allow the film sensitivity suitability signal to enter the warning oscillation circuit through the gate $AND_{14}$. After the shutter releasing operation, the transistor $Q_{23}$ closes the gate $AND_{14}$ to prevent any input of flash output control signal into the warning oscillation circuit.

The state of transistor $Q_5$ on camera's side is detected by detecting the potential at terminal $T'_1$ by transistor $Q_{22}$. When the transistor $Q_5$ is rendered nonconductive which means that the film sensitivity set in TTL flash output control mode is proper or that no TTL flash output control signal is being generated, the transistor $Q_{22}$ is rendered nonconductive to change the output of gage $AND_{10}$ to Low. On the contrary, when the set film sensitivity is not proper, that is to say, when the transistor $Q_5$ is rendered conductive, the transistor $Q_{22}$ is also rendered conductive so as to bring the warning oscillation circuit into operation through gates $AND_{10}$, $OR_{12}$, $AND_{14}$ and $NOR_{10}$. Also, when the transistor $Q_5$ is rendered conductive as a result of generation of TTL flash output control signal, the transistor $Q_{22}$ is rendered conductive to apply a signal to the flash terminating circuit 11 through gates $AND_{10}$, $OR_{11}$ and $AND_{12}$.

The mode selection switch $SW_{10}$ is externally operated to select any one of contact c for TTL flash output control mode, contact d for independent flash output control mode and contact e for non-flash output control. The contact e is connected to a display diode $LED_{12}$ and NAND gate $NAND_{10}$. Therefore, when the contact e is selected by the mode selection switch $SW_{10}$, the light emitting diode $LED_{12}$ lights up to indicate it. At the same time, a low level signal is applied to the gate $NAND_{10}$ to keep transistor $Q_{28}$ nonconductive. Thereby the unexecuted flash output control detection $Q_{28}$, $Q_{29}$, $A_{11}$, $C_{14}$, $R_{21}$ are made inactive.

The contact d is connected to an independent flash output control mode display diode $LED_{11}$ and also to an AND gate $AND_{13}$ through inverter $INV_{11}$. Therefore, when this contact d is selected, the display diode $LED_{11}$ lights up to indicate the selected mode, independent flash output control mode. At the same time, the gate $AND_{13}$ is opened to allow a flash output control signal to be transmitted to the flash terminating circuit 11 from the flash output control signal forming comparator $A_{10}$.

The contact c is connected to TTL flash output control mode display diode $LED_{10}$. It is also connected, through inverter $INV_{10}$, to transistor $Q_{21}$, gate $AND_{10}$ and gate $AND_{14}$. Therefore, when this contact c is selected, the display diode $LED_{10}$ is turned on to indicate the selected mode, TTL flash output control mode and also transistor $Q_{21}$ is rendered conductive. At the same time, the gates $AND_{14}$ and $AND_{10}$ are opened. Film sensitivity suitability signal in TTL flash output control mode and TTL flash output control signal are allowed to be transmitted through transistor $Q_{22}$.

Transistors $Q_{20}$ and $Q_{21}$ and diode $D_{10}$ constitute a circuit for generating a TTL flash output control mode selection signal. When the contact c is selected, both of the transistors $Q_{20}$ and $Q_{21}$ in this circuit is rendered conductive to or hold the potential at terminal $T'_2$ into a low level. Concretely, the low level is a value as given by adding the forward voltage of diode $D_{10}$ to the base-emitter voltage of transistor $Q_{20}$. This low level potential constitutes the TTL flash output control mode selection signal By this mode selection signal the transistor $Q_9$ on camera's side is rendered nonconductive.

The manner of operation of the above described electroflash unit is as follows:

(1A) Operation in the case wherein TTL flash output control mode is selected by the flash unit the power source of which is in camera non-interlocking mode, and the mode on camera's side is electrical shutter control mode:

In this case, on the side of the electroflash unit shown in FIG. 2, its mode selection switch $SW_{10}$ is in connection with the contact c and its power source switch $SW_{12}$ is in connection with the contact h. On the side of the camera shown in FIG. 1, its change-over switch $SW_1$ is closed and switches $SW_6$ and $SW_7$ are open. As the power source of the flash unit is supplied, a small current determined by the current limiting resistor $R_{33}$ flows into the camera's side through terminal $T'_4$, $T_4$ as a flash synchronous time setting signal. This signal renders the flash synchronous time setting transistor $Q_{11}$ conductive to forcedly set the shutter to the flash synchronous time. The small current keeps the pilot lamp $LED_1$ on camera's side in the state of extinction essentially.

With the selection of contact c by the mode selection switch $SW_{10}$, the transistors $Q_{20}$ and $Q_{21}$ of TTL flash output control mode selection signal generator $Q_{20}$, $Q_{21}$, $D_{10}$ is rendered conductive to clamp the potential at terminal $T'_2$, $T_2$ to a lower level. Thus, TTL flash output control mode selection signal is supplied to the circuit on the camera to render its transistor $Q_9$ nonconductive. By nonconductivity of this transistor, on the side of camera, transistor $Q_6$ is rendered conductive and therefore power is supplied to TTL flash output control circuit 7.

In this manner, when TTL flash output control mode is selected, the flash unit issues TTL flash control mode selection signal which is detected by TTL flash output control mode discriminating circuit 6, $D_3$, $D_4$, $Q_9$ on camera's side to automatically start the power supply to TTL flash output control circuit 7. In this connection it should be noted that if the electroflash unit receives no power from its power source 15, the selection signal generator $Q_{20}$, $Q_{21}$, $D_{10}$ does not issue the above mentioned selection signal even when TTL flash output control mode is selected. Therefore, in this case, power is not supplied to TTL flash output control circuit 7 on camera's side. A further effective power saving of the camera's battery 1 can be attained by it.

On the other hand, since the camera is in electrical shutter control mode, the mechanically controlled high speed shutter time detecting comparator $A_{12}$ in the electroflash unit generates low level output which opens the gate $AND_{17}$ through inverter $INV_{14}$. Therefore, when the main capacitor $C_{16}$ has completely been charged up to a preselected value, the charge completion detecting circuit $ZD_2$, $R_{29}$, $R_{30}$ applies a High output to the gate $AND_{17}$ to render transistor $Q_{31}$ conductive. This turns the pilot lamp $LED_{13}$ on to indicate the completion of charging. Also, when the film sensitivity set on the camera is proper with respect to TTL flash output control mode, the transistor $Q_5$ is rendered nonconductive, which in turn renders the transistor $Q_{22}$ on the flash unit also nonconductive through terminal $T_1$, $T'_1$. Thereby the output of the gate $AND_{10}$ is changed to Low. Low output of the gate $AND_{10}$ and conductivity of transistor $Q_{20}$ make the output of the gate $OR_{12}$ Low to cause the gate $AND_{14}$ to be Low. Since the unexecuted flash output control detecting circuit $Q_{28}$, $Q_{29}$, $A_{11}$, $C_{14}$, $R_{21}$ remains still inactive, the output of its comparator $A_{11}$ is also Low. As mentioned above, the output of comparator $A_{12}$ also is Low. As all the outputs of comparators $A_{11}$ and $A_{12}$ and gate $AND_{14}$ are Low, the output of the gate $NOR_{10}$ becomes High to render transistor $Q_{30}$ conductive. In this state, the warning oscillation circuit $R_{25}$-$R_{28}$, $A_{13}$, $C_{15}$ is inactive and the output of its comparator $A_{13}$ remains unchanged at High. In this manner, when the set film sensitivity is proper, there is performed no warning operation as a matter of course.

On the other hand, the output of NAND gate $NAND_{11}$ is changed to Low by High outputs of gate $NOR_{10}$ and the charge completion detecting circuit $R_{29}$, $R_{30}$, $ZD_2$. By this low output of the gate $NAND_{11}$ the transistor $Q_{32}$ is rendered conductive through the gate $AND_{15}$. On conductivity of this transistor $Q_{32}$, resistors $R_{33}$ and $R_{34}$ are connected in parallel with each other. Consequently, a relatively large current serving as a charge completion signal flows into the pilot lamp $LED_1$ on the camera through terminal $T'_4$, $T_4$ to lighten the pilot lamp. In this manner, when the charging of the main capacitor $C_{16}$ is completed, both of the pilot lamp $LED_1$ on the camera and the pilot lamp $LED_{13}$ on the flash unit are turned on.

If the set film sensitivity is not proper for TTL flash output control mode, then the transistor $Q_5$ on camera's side becomes conductive. Therefore, the transistor $Q_{22}$ on the flash unit also becomes conductive. The output of $AND_{10}$ is changed to High by conductivity of $Q_{22}$ and then the output of $OR_{12}$ is changed to High. On the other hand, since the shutter has not been released yet and the synchro-switch $SW_5$ is in connection with the contact a, the transistor $Q_{23}$ is rendered nonconductive and therefore the output of inverter $INV_{12}$ is High. As all the outputs of $OR_{12}$, $INV_{10}$ and $INV_{12}$ are High, the output of $AND_{14}$ becomes High by which the transistor $Q_{30}$ is rendered nonconductive through gate $NOR_{10}$. Thereby the warning oscillation circuit $R_{25}$-$R_{28}$, $A_{13}$, $C_{15}$ is brought into operation. Thus, the oscillation circuit generates an oscillation output of several Hz at the output terminal of comparator $A_{13}$. This oscillation output controls the transistor $Q_{32}$ through gate $AND_{15}$ to turn the transistor on and off at a frequency of several Hz. Therefore, the pilot lamp $LED_1$ on the camera flickers as a warning of the fact that the set film sensitivity is not proper. At the time, both of the comparators $A_{11}$ and $A_{12}$ are Low in output level, which closes the gate $AND_{16}$ through $OR_{13}$. Therefore, the oscillation output of the warning circuit can not be transmitted to the transistor $Q_{31}$. Thus, the transistor $Q_{31}$ is controlled solely by the output of the charge completion detecting circuit $ZD_2$, $R_{29}$, $R_{30}$. Consequently, the pilot lamp $LED_{13}$ on the flash unit does not flicker at this time.

When the shutter has been opened fully, the synchro-switch $SW_5$ is connected to the contact b and the monostable circuit $Q_{24}$, $Q_{25}$, $R_{20}$, $C_{11}$ on the flash unit is triggered by the differentiation circuit $C_{10}$, $R_{60}$, $R_{61}$. After triggered, the transistor $Q_{24}$ of the monostable circuit $Q_{24}$, $Q_{25}$, $R_{20}$, $C_{11}$, continue to be conductive for a certain determined time longer than the maximum flash time of the flash unit. In response to conductivity of this transistor $Q_{24}$, the trigger circuit 12 makes the flash discharge tube 13 start flashing and at the same time it brings the latch circuit $AND_{11}$, $OR_{10}$ into the waiting position which is the same position as the reset position. Conductivity of the transistor $Q_{24}$ further opens the gate $AND_{12}$, inverses the output of $NAND_{10}$ to Low to render transistor $Q_{28}$ conductive. As the transistor $Q_{29}$ is nonconductive, conductivity of the transistor $Q_{28}$ causes the condenser $C_{14}$ to be fully charged in a moment. Also, transistor $Q_{23}$ is rendered conductive by the connection of the synchro-switch $SW_5$ to the contact b. Conductivity of this transistor $Q_{23}$ closes the gate $AND_{14}$ through inverter $INV_{12}$ to block the transmission of signals from the camera to the flash unit through terminal $T'_1$ thereafter.

Thereafter, TTL flash output control circuit 7 carries out the integration of light quantity. When the integrated light quantity reaches a predetermined value, the circuit 7 issues a flash terminating signal, that is, a flash output control signal by which the transistor $Q_5$ on the camera's side is rendered conductive. Conductivity of this transistor $Q_5$ renders the transistor $Q_{22}$ conductive to change the output of the gate $AND_{10}$ to High. By this High output of $AND_{10}$ the output of $AND_{12}$ is changed to High through $OR_{11}$ to bring the flash terminating circuit 11 into operation. Thus, flashing of the flash discharge tube 13 is terminated. At the same time, the output of $AND_{12}$ triggers the latch circuit $AND_{11}$, $OR_{10}$. Thereby the outputs of the gates $AND_{11}$ and $OR_{10}$ are held at High. Even if the output of $AND_{12}$ is inverted to Low after that, the holding of High level continues so long as the output of the monostable circuit $Q_{24}$, $Q_{25}$, $R_{20}$, $C_{11}$ is present. High output of the gate $OR_{10}$ of this latch circuit inverses the output of the gate $NAND_{10}$ to High, renders transistor $Q_{28}$ nonconductive and also renders transistor $Q_{29}$ conductive. Therefore, the capacitor $C_{14}$ is discharged in a moment.

In this manner, the capacitor $C_{14}$ of the unexecuted flash output control detecting circuit $Q_{28}$, $Q_{29}$, $A_{11}$, $C_{14}$, $R_{21}$ is fully charged in a moment simultaneously with the start of flashing and its comparator $A_{11}$ is reversed to High so as to operate the warning oscillation circuit through $NOR_{10}$ and $Q_{30}$. However, when a flash output control operation has once been executed, the capacitor $C_{14}$ is discharged by the flash output control signal then generated. This discharging of the capacitor $C_{14}$ takes place immediately after the start of flashing (within the time of several milliseconds at the latest). By this instant discharge, the comparator $A_{11}$ is again returned back to Low output to stop the operation of the warning oscillation circuit. Therefore, in case that the flash output control has been executed, the unexecuted flash output control detecting circuit does not actuate the warning oscillation circuit virtually and there is given no warning of unexecuted flash output control.

There is a case wherein the integrated light quantity in TTL flash output control circuit 7 of the camera can not reach the predetermined value even after the electroflash unit has emitted the maximum amount of flashlight. In such case, there is provided no flash output control signal. Therefore, the latch circuit $AND_{11}$, $OR_{10}$ is not triggered and the output of its OR gate $OR_{10}$ remains unchanged at Low. Transistor $Q_{29}$ also remains nonconductive. As a result, the charge on the capacitor $C_{14}$ is discharged not instantly but gradually through resistor $R_{21}$. The comparator $A_{11}$ holds its High output for a certain time long determined by the time constant of resistor $R_{21}$ and capacitor $C_{14}$, for example, several seconds. During this holding time, it brings the warning oscillation circuit $R_{25}$-$R_{28}$, $A_{13}$, $C_{15}$ into operation. This high level output of the comparator $A_{11}$ opens the gate $AND_{16}$ at the same time. On the other hand, since the main capacitor $C_{16}$ has been already discharged completely, the output of the charge completion detecting circuit $ZD_2$, $R_{29}$, $R_{30}$ at the time is Low which opens the gate $AND_{15}$ through $NAND_{11}$. Consequently, the oscillating output of the warning oscillation circuit controls the transistor $Q_{32}$ through $AND_{15}$ and also controls the transistor $Q_{31}$ through $AND_{16}$ and $OR_{14}$. Thus, the pilot lamp $LED_1$ on the camera as well as the pilot lamp $LED_{13}$ of the flash unit begin flickering.

In this manner, if the flash output control has not been executed, the unexecuted a flash output control detecting circuit detects the absence of flash output control signal and flickers both of the pilot lamps for a determined time to indicate the unexecution of flash output control. The high level output of the comparator $A_{11}$ indicative of the unexecution of flash output control, not only operates the warning oscillation circuit in the above described manner but also inhibits or suppresses the operation of booster circuit 14 at the same time. This inhibition or suppression has an effect to prevent voltage drop of the power source 15 and assure the supply of sufficient power to various circuits for giving a warning of the unexecuted flash output control.

As readily understood from the foregoing, in the case wherein the electronic flash unit is in TTL flash output control mode and the camera is in electrical shutter control mode, two different kinds of time series signals are transmitted to the flash unit from the camera through the same terminal $T_1$, $T'_1$. More particularly, before shutter releasing operation there is transmitted to the flash unit a signal informing of the suitability of set film sensitivity and after shutter releasing operation there is transmitted TTL flash output control signal. The electronic flash unit directs the different signals to different circuits in response to a synchronizing signal transmitted thereto from the camera through another terminal $T_3$, $T'_3$. More particularly, before receiving the synchronizing signal, the flash unit supplies the above suitability signal to the warning oscillation circuit. After receiving the synchronizing signal, the flash unit supplies the above flash output control signal to the flash terminating circuit etc. In this manner, even using the same terminal for transmitting two different kinds of signals, the apparatus can deliver the respective signals to the respective determined circuits therefor.

(IIA) Operation in the case wherein the electronic flash unit is in the same mode as in the above (IA), namely TTL flash output control mode with its power source being in a camera non-interlocking mode but the camera is in mechanical shutter control mode with its shutter time being longer than the flash synchronous time:

In this case, no power is supplied to the circuit on the camera because of its change-over switch $SW_1$ being open. Therefore, the TTL flash output control circuit 7 on the camera is inactive. In this case, even if TTL flash output control mode is selected in the flash unit, the selected TTL flash output control is impossible to carry out. To indicate it, the apparatus previously gives a warning to the effect that TTL flash output control is impossible.

Since no power is supplied to the camera's circuit, the current source 6 of the camera is inactive and there is no current supply from the camera to the flash unit through terminal $T_2$, $T'_2$. Therefore, on the side of flash unit, transistor $Q_{20}$ is nonconductive and the output of gate $OR_{12}$ is High. Also, as the terminal c is selected, the output of inverter $INV_{10}$ becomes High. Before releasing the shutter, transistor $Q_{23}$ is nonconductive and therefore the output of inverter $INV_{12}$ is also High. All the outputs of $OR_{12}$, $INV_{10}$ and $INV_{12}$ are now High, which makes the output of gate $AND_{14}$ High and the output of $NOR_{10}$ Low. Consequently, transistor $Q_{30}$ is rendered nonconductive to actuate the warning oscillation circuit $R_{25}$-$R_{28}$, $A_{13}$, $C_{15}$. The low level output of $NOR_{10}$ opens the gate $AND_{15}$ through $NAND_{11}$. Therefore, the oscillating output of the warning oscillation circuit controls the transistor $Q_{32}$ through gate $AND_{15}$. Thereby, a pulsating current is supplied to the camera through terminal $T'_4$. Since switch $SW_6$ is closed although transistor $Q_{10}$ is nonconductive, the pulsating current is allowed to flow into the pilot lamp $LED_1$ on the camera. Thus, the pilot lamp $LED_1$ flickers as a warning of impossibility of TTL flash output control. But, the pilot lamp $LED_{13}$ on the side of flash unit does not flicker at the time. The reason for this is as follows:

In the case now being discussed, the shutter time is longer the flash synchronous time and therefore the output level of the mechanically controlled high speed shutter time detecting comparator $A_{12}$ is low. On the other hand, the comparator $A_{11}$ in the unexecuted flash output control detecting circuit is also Low in output level. Therefore, the output of gate $OR_{13}$ becomes low which closes the gate $AND_{16}$. Consequently, the transistor $Q_{31}$ becomes independent of the oscillating output of the warning oscillation circuit. The transistor $Q_{31}$ is controlled solely by the output of the charge detection circuit. Therefore, the pilot lamp $LED_{13}$ on the electroflash unit does not flicker at this time. Warning of impossibility of TTL flash output control is given only by the pilot lamp $LED_1$ on the camera's side. The pilot lamp $LED_{13}$ on the electroflash unit is not used for this purpose for the following reason:

So long as the power supply transistor $Q_1$ is nonconductive, no power is supplied to the circuit on the camera even when the camera is in electrical shutter control mode and the change-over switch $SW_1$ is closed. The electronic flash unit mistakes this state for the opened state of the change-over switch $SW_1$. If the pilot lamp $LED_{13}$ on the flash unit is so formed as to flicker for warning whenever no power is supplied to the camera's circuit, then the pilot lamp $LED_{13}$ will flicker also in the case of no power supply to the camera's side caused by nonconductivity of transistor $Q_1$. To prevent it, in the shown embodiment, the pilot lamp $LED_{13}$ of the flash unit is so formed as not to flicker for the above warning. The pulsating current supplied to the camera from the flash unit through terminal $T_4$ at that time does not cause any erroneous warning display because when the camera's power supply transistor $Q_1$ is nonconductive, transistor $Q_{10}$ is rendered nonconductive to forcedly turn, the pilot lamp $LED_1$ off.

In the above, description has been made referring to the case wherein the camera is provided with TTL flash output control circuit 7 but there is no power supply to it. However, it is to be understood that the above description may be applied also to such camera without TTD flash output control circuit. In this case, the camera is not provided with terminal $T_2$. Therefore, the pilot lamp $LED_1$ on the camera flickers to give a warning that the selection of TTL flash output control mode at the flash unit is improper.

As will be understood from the foregoing, the transistor $Q_{20}$ in the above apparatus is not only a member of TTL flash output control mode selection signal generating circuit but also constitutes a detection circuit for detecting whether or not TTL flash output control is possible on the camera's side. When the camera is in the state of non-TTL flash output control, the transistor $Q_{20}$ is rendered nonconductive to actuate the warning oscillation circuit $R_{25}$-$R_{28}$, $A_{13}$, $C_{15}$ as described above.

(IIIA) Operation in the case wherein the electroflash unit is in independent flash output control mode with its power source switch being in camera non-interlocking mode and the camera is in electrical shutter control mode or mechanical shutter control mode with the flash synchronous time:

In this case, since the mode selection switch $SW_{10}$ of the flash unit is in connection with the contact d, the output of inverter $INV_{11}$ is High by which the gate $AND_{13}$ is opened. In this state, the output of the independent flash output control signal forming comparator $A_{10}$ can actuate the flash terminating circuit 11 and the unexecuted flash output control detecting circuit $Q_{28}$, $Q_{29}$, $A_{11}$, $C_{14}$, $R_{21}$ through the gates $AND_{13}$, $OR_{11}$ and $AND_{12}$. When the shutter is fully opened and the synchro-switch $SW_5$ is connected to the contact b, the differentiation circuit $C_{10}$, $R_{60}$, $R_{61}$ renders the transistor $Q_{24}$ of the monostable circuit conductive by its differentiation pulse in response to the synchro-switch. Thereby the trigger circuit 12 is brought into operation to start flashing. At the same time, the transistor $Q_{26}$ is rendered nonconductive by conductivity of transistor $Q_{24}$ to make the integration circuit $PD_{10}$, $C_{12}$, $C_{13}$, $SW_{11}$, $Q_{27}$ start integration of the light quantity. When the integration output of the light quantity integration circuit exceeds the reference voltage of Zener diode $ZD_1$, the flash output control signal forming comparator $A_{10}$ generates a high level output i.e. flash output control signal. This signal actuates the flash terminating circuit 11 through gates $AND_{13}$, $OR_{11}$ and $AND_{12}$ to terminate flashing and also renders transistor $Q_{29}$ conductive through the gate $OR_{10}$ of the latch circuit to transmit information of execution of flash output control operation to the unexecuted flash output control detecting circuit. If the flash output control has not been executed, more particularly if no flash output control signal has been generated during the time of transistor $Q_{24}$ being conductive, then the unexecuted flash output control detecting circuit $Q_{28}$, $Q_{29}$, $A_{11}$, $C_{14}$, $R_{21}$ actuates the warning oscillation circuit $R_{25}$-$R_{28}$, $A_{13}$, $C_{15}$ to flicker both of the pilot lamps $LED_1$ and $LED_{13}$. Of course, in this independent flash output control mode, TTL flash output control mode selection signal generating circuit $Q_{20}$, $Q_{21}$, $D_{10}$ is inactive and therefore no power is supplied to TTL flash output control circuit 7 on the camera.

(IVA) Operation in the case wherein the electroflash unit is in non-flash output control mode namely entire flash mode with its power source switch being in camera non-interlocking mode and the camera is in electrical shutter control mode or in mechanical shutter control mode with the shutter time being longer than the flash synchronous time:

In this case, the mode selection switch $SW_{10}$ is in connection with the contact e and keeps the transistor $Q_{28}$ nonconductive through gate $NAND_{10}$. Therefore, the unexecuted flash output control detecting circuit is inactive and no warning of unexecuted flash output control is given. By releasing the shutter after lighting of the pilot lamps $LED_1$ and $LED_{13}$ on the camera and on the flash unit, entire flashing of the electroflash unit is performed. In other words, the electroflash unit emits flashlight for its maximum flash time.

(VA) Operation in the case wherein the electroflash unit is in camera non-interlocking power source mode and the camera in the mechanical shutter control mode with a shorter shutter time than the flash synchronous time:

In this case, switches $SW_4$ and $SW_7$ on camera's side are both closed and the pilot lamp $LED_1$ on the camera is turned off. Further, the mechanical controlled high speed shutter time detecting comparator $A_{12}$ has High output, which in turn makes the output of gate $NOR_{10}$ Low to render transistor $Q_{30}$ nonconductive thereby bringing the warning oscillation circuit $R_{25}$-$R_{28}$, $A_{13}$, $C_{15}$ into operation. Also, the high level output of the comparator $A_{12}$ opens the gate $AND_{16}$ through $OR_{13}$ and closes the gate $AND_{17}$ through inverter $INV_{14}$. Therefore, the transistor $Q_{31}$ is controlled solely by the oscillating output of the warning oscillation circuit so as to flicker the pilot lamp $LED_{13}$. In this manner, in case that the set shutter time is improper for flashlight photographing, only the pilot lamp $LED_{12}$ on the electroflash unit's side flickers to give a warning of it.

(VIA) Operation in the case wherein the power source of the electroflash unit is in camera interlocking mode and the camera is in electrical shutter control mode:

In this case, the power source switch $SW_{12}$ of the flash unit is connected to the contact f to charge the capacitor $C_{17}$ through resistor $R_{31}$. This charge current renders transistors $Q_{33}$ and $Q_{34}$ conductive to effect a power supply to the circuit of the flash unit, by which the main capacitor $C_{16}$ is charged. After a definite time determined by the time constant of resistor $R_{31}$ and capacitor $C_{17}$ the transistors $Q_{33}$ and $Q_{34}$ are rendered nonconductive to block the power supply. During the time, charging of the main capacitor $C_{16}$ is completed. By conductivity of the power supply transistor $Q_1$ on the camera, the constant current source 6 supplies the current to the flash unit through terminal $T_2$, $T'_2$ to render transistor $Q_{35}$ conductive. Thereby the capacitor $C_{17}$ is short-circuited and at the same time the transistor $Q_{33}$ and $Q_{34}$ are rendered conductive. Therefore, the power supply to the flash unit is again started. This power supply to the flash unit is maintained so long as the power supply to the camera continues.

When the power supply transistor $Q_1$ of the camera is rendered nonconductive to cut off the power supply to the camera, the transistor $Q_{35}$ on the flash unit's side is also rendered nonconductive. By this nonconductivity of $Q_{35}$ charging of the capacitor $C_{17}$ is started. The transistor $Q_{33}$ continues to be conductive for the above mentioned determined time after nonconductivity of $Q_{35}$. After completing the charging of the main capacitor $C_{16}$, the transistor $Q_{33}$ is rendered nonconductive to cut off the power supply to the flash unit.

In this manner, in case that the power source switch $SW_{12}$ is in camera interlocking mode, the power source of the flash unit is supplied in response to supply of the power source to camera's side. Since, in this case, the switch $SW_{12}$ has already been in connection with the contact f which always results in charging of the main capacitor, it is possible to start flashlight photographing at once. Moreover, even when the power supply to the camera is cut off, flashlight photographing can be started soon after restarting the power supply to the camera. The reason for this is that even when the power supply to the camera is cut off, the transistor $Q_{33}$ becomes nonconductive only after the main capacitor $C_{16}$ has been charged completely.

The resistance value of the resistor $R_{32}$ mentioned above is determined in the following manner:

When the mode selection switch $SW_{10}$ is not in the position to select the contact C for TTL flash output control mode, the current supplied to terminal $T_2$, $T'_2$ from the camera's constant current source 6 does not flow into TTL flash output control mode selection signal generating circuit $Q_{20}$, $Q_{21}$, $D_{10}$ but flows all into the resistor $R_{32}$ to render transistor $Q_{35}$ conductive. The resistance value of the resistor $R_{32}$ is preset to such value at which the potential at $T_2$, $T'_2$ appearing at that time is insufficient to render the transistor $Q_9$ of the camera nonconductive.

In the combination of the electroflash unit shown in FIG. 2 and the camera shown in FIG. 1, as described above, the flash unit transmits its TTL flash output control mode selection signal to the TTL flash output control mode discriminating circuit of the camera through terminal $T'_2$, $T_2$ as a signal in the form of voltage. On the contrary, the signal indicative of the power supply to the camera is transmitted to the power supply control circuit of the flash unit from the camera through terminal $T_2$, $T'_2$ as a signal in the form of current. In this manner, the two different signals transmitted between the camera and the flash unit through the same terminal $T_2$, $T'_2$ are different in form, one of which is current and the other is voltage. This makes it possible to transmit different signals through the same terminal at the same time.

(VIIA) Operation in the case of no power supply to the electroflash unit:

In this case, the power source switch $SW_{12}$ is in connection with the contact g and therefore no power is supplied to the circuit in the flash unit. Consequently, TTL flash output control mode selection signal generator $Q_{20}$, $Q_{21}$, $D_{10}$ remain inactive even if the mode selection switch $SW_{10}$ is in connection to the contact C for selecting TTL flash output control mode. Therefore, in this state of the apparatus, no power is supplied to TTL flash output control circuit 7 on the camera, which has an effect to prevent any unnecessary power consumption in the apparatus.

Figure 3:
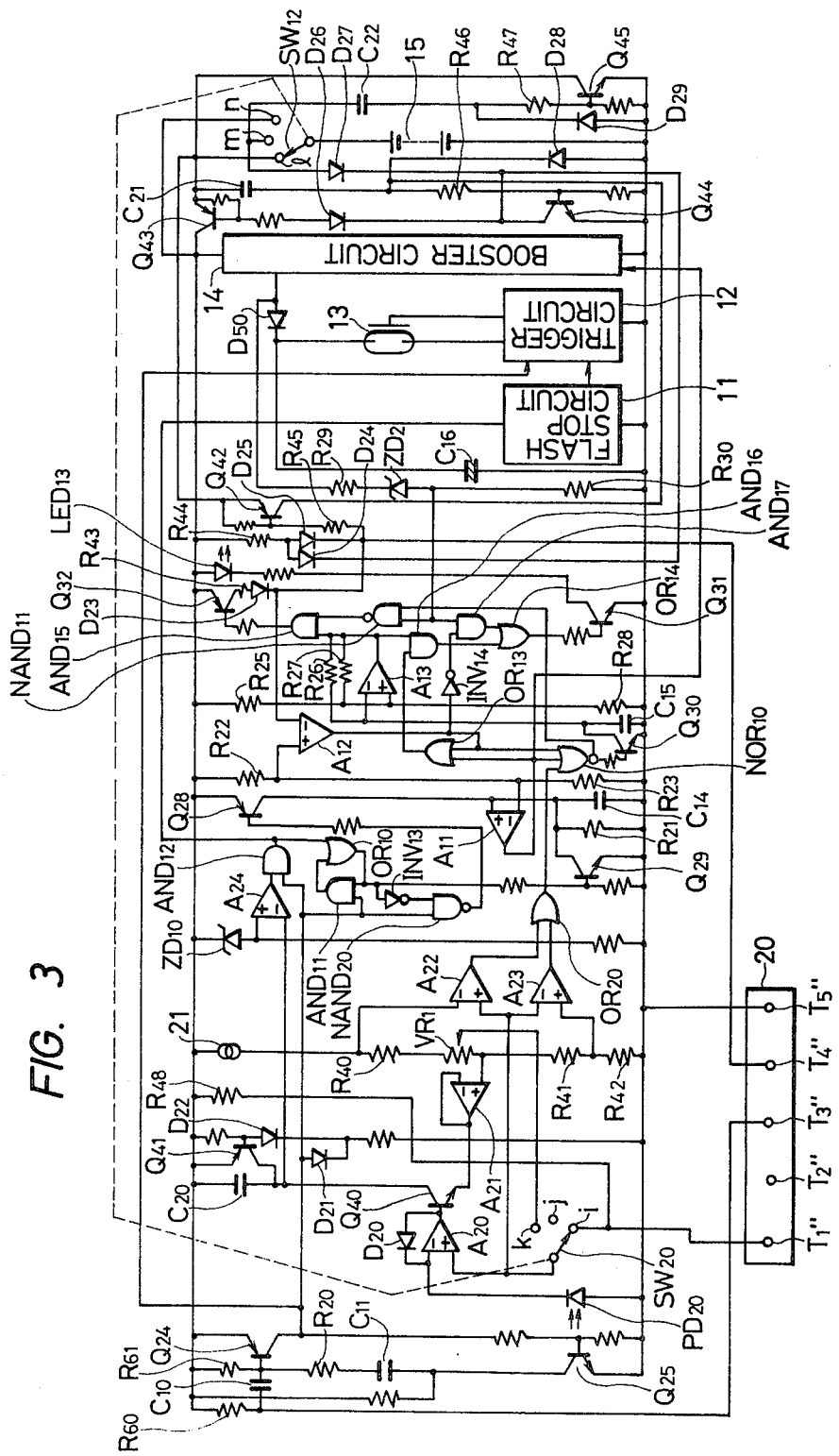

FIG. 3 illustrates another embodiment of an electroflash device according to the present invention. The flash unit of this embodiment has only two modes, namely camera interlocking flash output control mode and independent flash output control mode. It does not have TTL flash output control mode.

Referring to FIG. 3, the flash unit has a mounting foot portion 20 provided with five terminals $T_1''$, $T_2''$, $T_3''$, $T_4''$ and $T_5''$. Since, as noted above, the electroflash unit does not have TTL flash output control mode, the contact $T_2''$ for TTL flash output control is left unconnected after mounting. These five terminals $T_1''$, $T_2''$, $T_3''$, $T_4''$ and $T_5''$ are connected to the corresponding five terminals $T_1$, $T_2$, $T_3$, $T_4$ and $T_5$ on the camera shown in FIG. 1 respectively in mounting the electroflash unit on the camera.

The power source of the flash unit is designated by 15 at the right-hand edge of FIG. 3. Connected to the power source 15 is a power source switch $SW_{21}$ having three contacts l, m and n. When the camera interlocking mode contact l is selected by the power source switch $SW_{21}$, the power supply to the circuit on the flash unit's side is effected interlocking with the power supply on the side of camera. When the contact m is selected, the power supply to the flash unit is cut off at all. When the camera uninterlocking contact n is selected, power is always supplied to the flash unit.

The power source switch $SW_{21}$ is in link with a flash output control mode selection switch $SW_{20}$ shown in FIG. 3 at left-hand and lower side of the drawing. When the power source switch $SW_{21}$ is moved to select contact l, m or n, the mode selection switch $SW_{20}$ interlocked with the switch $SW_{21}$ is moved to select camera interlocking flash output control mode contact i, nonconnection contact j or independent flash output control mode contact k respectively. Transistors $Q_{42}$, $Q_{43}$, $Q_{44}$, capacitor $C_{21}$, resistor $R_{46}$ and diode $D_{26}$ shown at the right-hand side of the drawing constitute a power supply control circuit. When the power source switch $SW_{21}$ is connected to contact l, the transistors $Q_{43}$ and $Q_{44}$ in the power supply control circuit are rendered conductive for a selected time long determined by the time constant of capacitor $C_{21}$ and resistor $R_{46}$ so that the power supply control circuit allows power supply to the circuits on the flash unit. The time mentioned above is preset to that which is equal to or a little longer the charge time to the main capacitor $C_{16}$. The emitter of transistor $Q_{42}$ is connected to the contact l and the base is connected to the terminal $T_4''$ through resistor $R_{45}$. Its emitter-collector is connected in parallel to the condenser $C_{21}$. When the camera interlocking mode contact l is selected by the switch $SW_{21}$ and power is supplied to the camera, a small current flows through the emitter-base of transistor $Q_{42}$, resistor $R_{45}$ and terminal $T_4''$. Thereby the transistor $Q_{42}$ is rendered conductive and the capacitor $C_{21}$ is short-circuited to hold transistors $Q_{43}$ and $Q_{44}$ conductive. This small current functions as a flash synchronous shutter time setting signal.

Transistor $Q_{45}$, resistor $R_{47}$, capacitor $C_{22}$ and diode $D_{28}$ constitute a discharge circuit by which the capacitor $C_{21}$ is forcedly discharged. When the power source switch $SW_{21}$ is connected to the contact m, this discharge circuit forcedly discharges the capacitor $C_{21}$ in a moment. Series-connected to the capacitor $C_{22}$ is a diode $D_{29}$ which together with diode $D_{27}$ and transistor $D_{44}$ forms a discharge loop for capacitor $C_{22}$.

The structures and functions of booster circuit 14, flash discharge tube 13, trigger circuit 12, flash terminating circuit 11, main capacitor $C_{16}$, diode $D_{50}$ and charge completion detecting circuit $ZD_2$, $R_{29}$, $R_{30}$ are all the same as these in FIG. 2 and therefore need not be further described.

Resistor $R_{44}$ and diode $D_{25}$ supply a small current serving as a flash synchronous time setting signal to the camera through terminal $T_4''$ when the power source switch $SW_{21}$ is in camera uninterlocking mode. More concretely, when the contact l is selected by the power source switch $SW_{21}$, the small current is supplied to the terminal $T_4''$ through the emitter-base of transistor $Q_{42}$ and resistor $R_{45}$. When the contact n is selected, the small current flows to the terminal $T_4''$ through resistor $R_{44}$ and diode $D_{25}$. $D_{24}$ is a diode whose anode is connected to that of diode $D_{25}$ and cathode to the collector of transistor $Q_{44}$ so that when the contact l is selected, the current flowing through the resistor $R_{44}$ is directed to transistor $Q_{44}$ through diode $D_{24}$ but not to terminal $T_4''$. The structures and functions of pilot lamp $LED_{13}$ and transistor $Q_{31}$ connected thereto are entirely the same as those in FIG. 2 and therefore need not be further described. Transistor $Q_{32}$, resistor $R_{43}$ and diode $D_{23}$ are connected in series each other to supply a large current to the pilot lamp $LED_1$ of the camera through terminal $T_4''$, $T_4$ to turn it on when the transistor $Q_{32}$ is rendered conductive.

The functions of NAND gate $NAND_{11}$, AND gates $AND_{15}$, $AND_{16}$, $AND_{17}$, OR gates $OR_{13}$, $OR_{14}$, inverter $INV_{14}$ and NOR gate $NOR_{10}$ are all the same as those of the corresponding ones shown in FIG. 1. Also, transistor $Q_{30}$ and warning oscillation circuit $R_{25}$-$R_{28}$, $C_{15}$, $A_{13}$ correspond to those in FIG. 2 in function. Voltage dividing resistors $R_{22}$ and $R_{23}$, mechanically controlled high speed shutter time detecting comparator $A_{12}$ and unexecuted flash output control detector $Q_{28}$, $Q_{29}$, $A_{11}$, $C_{14}$, $R_{21}$ also correspond to those in FIG. 2 embodiment. AND gate $AND_{12}$ and latch circuit $OR_{10}$, $AND_{11}$, inverter $INV_{13}$ have the same functions as the corresponding ones shown in FIG. 2. Function of $NAND_{20}$ is similar to that of $NAND_{10}$ in FIG. 2 embodiment. Comparator $A_{24}$ for forming a flash output control signal and Zener diode $ZD_{10}$ for generating a reference voltage have the same functions as those of comparator $A_{10}$ and Zener diode $ZD_1$ shown in FIG. 2. More particularly, the comparator $A_{24}$ makes a comparison between the reference voltage of the Zener diode $ZD_{10}$ and the integrated output from the light quantity integrating circuit $PD_{20}$, $A_{20}$, $D_{20}$-$D_{22}$, $Q_{40}$, $Q_{41}$, $C_{20}$. The photo diode $PD_{20}$ in the integrating circuit receives the flashlight reflected by the object. The differential amplifier $A_{20}$ has a logarithmic compression diode $D_{20}$ in its feedback loop and receives, at its one input, the flashlight information from the photo diode $PD_{20}$ and at its another input the exposure factor information of film sensitivity and diaphragm aperture through mode selection switch $SW_{20}$ in the manner later described. The transistor $Q_{40}$ logarithmically expands the output of the differential amplifier $A_{20}$. In this manner, the transistor $Q_{40}$ has a collector current corresponding to both the value derived from the photo diode $PD_{20}$ and data of film sensitivity and diaphragm aperture. The integration condenser $C_{20}$ carries out integration of the above current in response to nonconductivity of transistor $Q_{41}$. Constant current source 21, resistors $R_{40}$-$R_{42}$ and variable resistor $VR_1$ constitute a reference voltage generator. The resistance value of resistor $VR_1$ is variable depending on the value of film sensitivity and diaphragm aperture then set on the side of flash unit. The reference voltage generated from the reference voltage generator 21, $R_{40}$-$R_{42}$, $VR_1$ is given to the emitter of transistor $Q_{40}$ by a follower amplifier $A_{21}$.

To detect it whether or not the set value of film sensitivity and diaphragm aperture in flash output control mode is within the range proper for the mode, there is provided a pair of comparators $A_{22}$ and $A_{23}$. When the set value is within the proper range, both of the comparators $A_{22}$ and $A_{23}$ become Low in output level. When it is not within the range, either one of amplifiers $A_{22}$ and $A_{23}$ becomes High in output. This high level output renders the transistor $Q_{30}$ nonconductive through $OR_{20}$ and $NOR_{10}$ to actuate the warning oscillation circuit $R_{25}$-$R_{28}$, $C_{15}$, $A_{13}$. The structures and functions of differentiation circuit $C_{10}$, $R_{60}$, $R_{61}$ and monostable multivibrator circuit $Q_{24}$, $Q_{25}$, $R_{20}$, $C_{11}$ are the same as those of the corresponding ones shown in FIG. 2 and therefore need not be further described.

The manner of operation of the above embodiment will be described hereinafter with reference to FIGS. 1 and 3.

(IB) Operation in the case wherein the electroflash unit is in camera interlocking flash output control mode and therefore its power source switch is also in camera interlocking mode, and the camera is in electrical shutter control mode:

in this case, the mode selection switch $SW_{20}$ is in connection to contact i and the power source switch $SW_{21}$ is in connection to contact l on the side of flash unit. On camera's side, the change-over switch $SW_1$ is closed. By the connection of the power source switch $SW_{21}$ to contact l, transistors $Q_{43}$ and $Q_{44}$ are rendered conductive for a certain time determined by condenser $C_{21}$ and resistor $R_{46}$ to supply the power to the circuits on the electroflash unit. Thus, the main capacitor $C_{16}$ is charged completely. After the lapse of the above determined time, both of transistors $Q_{43}$ and $Q_{44}$ are rendered nonconductive to cut off the power supply. When the power supply transistor $Q_1$ on the camera is rendered conductive to supply the power to the circuits on the camera, a small current flows from the flash unit's power source 15 to the camera through the emitter-base of transistor $Q_{42}$, resistor $R_{45}$ and terminal $T_4''$, $T_4$. On the camera's side, a portion of this small current flows into the base of the flash synchronous time setting transistor $Q_{11}$ through resistor $R_{15}$ and the remaining portion of the small current flows into the transistor $Q_{10}$ passing through the pilot lamp $LED_1$. This small current is preset to such a level at which it can render conductive both of transistor $Q_{42}$ on the flash unit and transistor $Q_{11}$ on the camera but can not virtually lighten the pilot lamp on the camera.

By conductivity of this transistor $Q_{42}$ the capacitor $C_{21}$ is short-circuited to render transistors $Q_{43}$ and $Q_{44}$ conductive to thereby effect power supply to the circuits on the electroflash unit. On the other hand, by conductivity of the transistor $Q_{11}$ on the camera, the shutter is automatically set to the flash synchronous time.

In this manner, when the camera interlocking mode contact l is selected by the power source switch $SW_{21}$, a small current automatically flows from camera to flash unit in response to the start of power supply to the camera. Thereby, power supply to the flash unit is started and simultaneously the shutter on the camera is automatically set to the flash synchronous time. As will be understood from the foregoing, this small current performs two different functions at the same time, that is, as a signal for power supply to the flash unit on one hand and as a signal for setting the shutter to flash synchronous time on the other hand. In this connection it is to be understood that when the power supply transistor $Q_{43}$ is conductive, current is supplied also to resistor $R_{44}$ but the current flowing through it is essentially directed not to diode $D_{25}$ but to transistor $Q_{44}$. The reason for this is that when transistor $Q_{43}$ is conductive, transistor $Q_{44}$ also becomes conductive and therefore the current flowing through resistor $R_{44}$ flows toward the transistor $Q_{44}$ through diode $D_{24}$. Essentially no portion of the current flows into the diode $D_{25}$. This has an effect to prevent such possibility that the current flowing toward terminal $T_4''$ may become so large as to light up the pilot lamp $LED_1$ on the camera.

Since the terminal $T_2''$ is left unconnected, the transistor $Q_9$ of the camera is conductive and therefore no power is supplied to TTL flash output control circuit 7 on the camera. Transitors $Q_9$ and $Q_{11}$ on the camera's side are conductive by which the outputs of inverters $INV_2$ and $INV_3$ are changed to High. As a result, the output of $AND_3$ also becomes High to actuate the amplifier $A_3$. Therefore, the amplifier $A_3$ transmits to terminal $T_1$ the exposure factor information signal of film sensitivity and diaphragm aperture then set at the camera's side. This information signal is applied to one input of operational amplifier $A_{20}$ through terminal $T_1''$ and mode selection switch $SW_{20}$ of the flash unit. In this manner, in case of the camera interlocking flash output control mode, information of exposure factor of film sensitivity and diaphragm aperture set at the camera's side can be introduced into the light quantity integrating circuit on the flash unit in response to the power supply to the camera. The detecting circuit $A_{22}$, $A_{23}$ makes a detection as to whether the introduced exposure factor information signal from the mode selection switch $SW_{20}$ is within the range proper for flash output control mode or not. When it is not within the range, one of the comparators $A_{22}$ and $A_{23}$ produces a high level output by which the transistor $Q_{30}$ is rendered nonconductive through gates $OR_{20}$ and $NOR_{10}$ to bring into operation the warning oscillation circuit $R_{25}$-$R_{28}$, $A_{13}$, $C_{15}$. The oscillating output from the warning circuit renders the transistor $Q_{32}$ conductive and nonconductive at a constant frequency. When the transistor $Q_{32}$ is conductive, a large current flows into the camera through diode $D_{23}$ and terminal $T_4''$. Therefore, with conductivity and nonconductivity of the above transistors $Q_{32}$ the pilot lamp $LED_1$ on the camera flickers to give a previous warning of the fact that the set value of film sensitivity-diaphragm aperture is improper for flash output control mode. At this time, the comparator $A_{11}$ in the unexecuted flash output control detecting circuit $Q_{28}$, $Q_{29}$, $A_{11}$, $C_{14}$, $R_{21}$ and the mechanically controlled high speed shutter time detecting comparator $A_{12}$ are both Low in output level. Therefore, the output of $OR_{13}$ also becomes Low and the output of $AND_{16}$ is changed to Low thereby. Consequently, the transistor $Q_{31}$ is never affected by the output of the warning oscillation and therefore pilot lamp $LED_{13}$ on the flash unit does not operate for warning in this case. When the above mentioned exposure factor information signal is within the range proper for flash output control mode, the outputs of comparators $A_{22}$ and $A_{23}$ are both High in output level and therefore the warning oscillation circuit remains inactive.

When the charge completion detecting circuit $ZD_2$, $R_{29}$, $R_{30}$ detects the completion of charging of the main capacitor $C_{16}$, the detecting circuit renders transistor $Q_{32}$ conductive through gates $NAND_{11}$ and $AND_{15}$ on one hand and renders transistor $Q_{31}$ conductance through gates $AND_{17}$ and $OR_{14}$ on the other hand. On conductive of these transistors $Q_{32}$ and $Q_{31}$, the pilot lamp $LED_1$ on the camera as well as the pilot lamp $LED_{13}$ on the flash unit light up to indicate that the apparatus is now ready for flashing.

When the shutter is fully opened, a signal is transmitted to the differentiation circuit $C_{10}$, $R_{60}$, $R_{61}$ from the camera through terminal $T_3$, $T_3''$. In response to the signal, the differentiation circuit triggers the monostable circuit $Q_{24}$, $Q_{25}$, $R_{20}$, $C_{11}$. Thereby the transistor $Q_{24}$ is rendered conductive and continues to be conductive for a determined time (which time is equal to or a little longer than the maximum flash duration time of the electroflash unit). In response to conductivity of this transistor, the trigger circuit 12 makes the flash discharge tube 13 start flashing. Also, conductivity of this transistor $Q_{24}$ renders transistor $Q_{41}$ nonconductive through diodes $D_{21}$ and $D_{22}$ at the same time to start the light quantity integrating operation of the capacitor $C_{20}$. The photo diode $PD_{20}$ receives the flashlight reflected by the object and the capacitor $C_{20}$ carries out integration of the received flashlight. As soon as the output of integrated flashlight has reached the level of the reference voltage by Zener diode $ZD_{10}$, the output of the comparator $A_{24}$ is reversed from Low to High to produce a flash output control signal. This signal changes the output of $AND_{12}$ to High by which the flash terminating circuit 11 is actuated. Thus, flashing is terminated. At the same time, High output of $AND_{12}$ renders transistor $Q_{29}$ conductive through gate $OR_{10}$ to discharge the capacitor $C_{14}$ in a moment.

As understood from the above, when a flash output control operation is executed in the manner described above, the unexecuted flash output control detecting circuit $Q_{28}$, $Q_{29}$, $A_{11}$, $C_{14}$, $R_{21}$ does not virtually operate the warning oscillation circuit $R_{25}$-$R_{28}$, $A_{13}$, $C_{15}$, which is the same as the first embodiment shown in FIG. 2. On the contrary, when the light quantity integration voltage of the capacitor $C_{20}$ has not reached the reference voltage given by Zener diode $ZD_{10}$, there is produced no flash output control signal. Therefore, like the first embodiment shown in FIG. 2, the unexecuted flash output control detecting circuit actuates the warning oscillation circuit for a predetermined time. Therefore, both of the pilot lamps $LED_1$ and $LED_{13}$ flicker indicating that no flash output control has been executed.

By nonconductivity of the power supply transistor $Q_1$ of the camera, the transistor $Q_{10}$ series-connected to the pilot lamp $LED_1$ is also rendered nonconductive which in turn restricts the small current flowing through terminal $T_4''$, $T_4$ from the flash unit. Therefore, the transistor $Q_{42}$ on the flash unit becomes nonconductive and charging of capacitor $C_{21}$ is started. When the charge voltage on the capacitor reaches a predetermined level, transistors $Q_{44}$ and $Q_{43}$ are rendered nonconductive to cut off the power supply to the flash unit. In this manner, when the power supply to the camera is cut off, the power supply to the flash unit is also automatically cut off interlocking with it. Like the first embodiment shown in FIG. 2, at this time the transistor $Q_{45}$ continues to be conductive for the predetermined time after the stop of power supply to the camera so as to complete charging of the main capacitor $C_{16}$. Therefore it is possible to carry out flashlight photographing immediately after restarting the power supply to the camera.

In the above embodiment, transistor $Q_{42}$ of the flash unit is controlled according to the state of transistor $Q_{10}$ on the camera's side. The latter mentioned transistor $Q_{10}$ is in turn controlled by the output of camera's battery checking comparator $A_2$. Therefore, if the voltage of camera's power source drops under a predetermined value, then the transistor $Q_{10}$ becomes nonconductive and there is no power supply to the flash unit even when the power supply transistor $Q_1$ of the camera is rendered conductive. This prevents flashlight photographing in camera interlocking flash output control mode under the condition of too low a voltage of the camera's power source. When the source voltage has dropped so much, problems in operation occur. For example, the electrical shutter control operation can not correctly be carried out and/or the exposure factor information signal can not correctly be transmitted. In such case, the above arrangement inhibits flashlight photographing in camera interlocking flash output control mode.

Conductivity of the above transistor $Q_{44}$ discharges the capacitor $C_{22}$ of the forced discharge circuit $C_{22}$, $R_{47}$, $Q_{45}$ through diodes $D_{27}$ and $D_{29}$. On change-over of the power source switch $SW_{21}$ from contact l to m, charging of the capacitor $C_{22}$ is started. The transistor $Q_{45}$ becomes conductive for a certain determined time so that the capacitor $C_{21}$ is discharged through the transistor $Q_{45}$ and diode $D_{28}$ in a moment. Thus, the capacitor gets in the state prepared for the next connection of power source switch $SW_{21}$ to the contact l.

(IIB) Operation in the case wherein the electronic flash unit is in camera interlocking flash output control mode and therefore its power source switch is in camera interlocking mode but the camera is in mechanical shutter control mode with flash synchronous time:

In this case, on the side of flash unit, switches $SW_{20}$ and $SW_{21}$ are connected to contacts i and l respectively. On the side of camera, its change-over switch $SW_1$ is opened, $SW_6$ is closed and $SW_7$ is opened. Since the transistor $Q_{10}$ is short-circuited by closing of switch $SW_6$, a small current flows into the pilot lamp $LED_1$ and the above switch $SW_6$ on the camera from the flash unit through terminal $T_4''$, $T_4$ on one hand. On the other hand, it flows into the base of transistor $Q_{11}$. Thereby the transistor $Q_{42}$ on the flash unit and therefore also the transistor $Q_{43}$ are rendered conductive. Thus, power supply to the flash unit is effected.

In the embodiment shown in FIG. 3, when the power source switch is in camera interlocking mode, power supply to the electroflash unit is effected naturally interlocking with the power supply to the camera in the manner described above. Moreover, in case of no power supply to the camera, the flash unit can be power-supplied interlocking with the selection of mechanical shutter control mode with flash synchronous time.

In the event that there is no power supply to the camera, the transistor $Q_5$ of the camera is nonconductive and the amplifier $A_3$ is inactive. As a result, the positive potential of power source 15 is applied to the contact i of the flash unit through resistor $R_{48}$. Thereby, the comparator $A_{22}$ in the exposure factor suitability detecting circuit becomes High in output level. This high level output renders transistor $Q_{30}$ nonconductive through gates $OR_{20}$ and $NOR_{10}$ to actuate the warning oscillation circuit $R_{25}$–$R_{28}$, $A_{13}$, $C_{15}$. The oscillating output from the warning circuit flickers the camera's pilot lamp $LED_1$ in the same manner as above to previously warn the operator that there is no introduction of exposure factor information signal from the side of camera and therefore the camera interlocking flash output control mode is impossible. Such previous warning is given also in the case wherein the camera is not provided with the function of generating the above mentioned exposure factor information signal. An example of such case is a camera as shown in FIG. 1 but without amplifier $A_3$. In this case, the terminal $T_1$ is left unconnected or connected to ground. The first mentioned unconnected state and the second mentioned grounded state can be detected by the comparators $A_{22}$ and $A_{23}$ of the introduced exposure factor suitability detecting circuit respectively. Therefore, a previous warning is given in a manner similar to the above.

(IIIB) Operation in the case wherein the electronic flash unit is in independent flash output control mode and therefore its power source switch is in camera non-interlocking mode:

In this case, since the power source switch $SW_{21}$ is in connection with the contact n, power supply to the flash unit is carried out independently of that to the camera. On the other hand, the mode selection switch $SW_{20}$ is in connection with the contact k. Therefore, the resultant value from film sensitivity and diaphragm aperture then set at the side of flash unit is introduced into the operational amplifier $A_{20}$ of the light quantity integrating circuit from the variable resistor $VR_1$. Naturally the outputs of the comparators $A_{22}$ and $A_{23}$ are both High under the condition of the voltage generated by the variable resistor $VR_1$.

When the camera is in electrical shutter control mode, the shutter is automatically set to the flash synchronous time by the small current flowing into the camera from the flash unit through resistor $R_{44}$, diode $D_{25}$ and terminal $T_4''$, $T_4$. With the opening of the shutter, the flash unit start flashing. Flash output control operation is performed on the basis of both the incident light to the photo diode $PD_{20}$ in the flash unit and the exposure value of film sensitivity-diaphragm aperture preset at the side of flash unit. If no flash output control has been executed, then the unexecuted flash output control detecting circuit detects it and actuates the warning oscillation circuit to flicker the pilot lamp $LED_1$ on the camera and the pilot lamp $LED_{13}$ on the flash unit.

(IVB) Operation in the case wherein the camera is in mechanical shutter control mode with shutter time shorter than flash synchronous time:

In this case, switches $SW_6$ and $SW_7$ of the camera are both closed. Therefore, the pilot lamp $LED_1$ on the camera remains always extinct. The high speed time detecting comparator $A_{12}$ of the flash unit detects the closed state of above two switches $SW_6$ and $SW_7$ and flickers the pilot lamp $LED_{13}$ on the flash unit through the warning oscillation circuit to previously warn that flashlight photographing is improper to the case.

While the invention has been particularly shown and described with reference to preferred embodiments thereof, obviously various modifications and variations are possible in light of the above teachings. For example, there may be used also display elements other than the light emitting elements shown in the above embodiments for giving various warnings described above.

Examples of other useful elements are optical display elements and acoustic elements. In the above embodiments, elements such as pilot lamps provided for displaying that the apparatus is ready for flashing, have been used also for warning. However, there may be provided display elements for warning only.

A light quantity integration circuit and/or TTL flash output control signal forming comparator for TTL flash output control mode may be provided also within the electroflash unit itself.

Also, a discrimination circuit for judging whether or not the value of film sensitivity introduced into the camera in TTL flash output control mode is proper, may be provided also within the electroflash unit. Furthermore, this discrimination circuit and the detection circuit provided on the side of flash unit for detecting the suitability of introduced exposure factors may be formed in common.

I claim:

1. An electroflash unit attachable to a camera having means for measuring light received through a photographing lens thereof, said electroflash unit comprising:
   a power source;
   terminal means for connecting the electroflash unit to the camera;
   means for effecting flash light emission;
   means for terminating said flash unit emission;
   means for generating, on said terminal means, a predetermined signal for plasting the light measuring means in a state in which it is ready for operation; and
   selection means for alternately selecting a first mode in which flash light emission is terminated in accordance with an output from said light measuring means or a second mode that is different from said first mode, and wherein said signal generating means generates said predetermined signal upon power being supplied to the electroflash unit from said power source and upon said first mode being selected by said selection means.

2. An electroflash unit according to claim 1, wherein said signal generating means includes a clamp circuit for clamping the potential on said terminal means to a low level potential that serves as said predetermined signal and which further comprises:
   signal detection means for detecting a current signal transmitted from the camera through said terminal means; and
   actuating means for actuating the electroflash unit in accordance with the detection output from said signal detection means.

3. A camera useful together with an electroflash unit as set forth in claim 1, said camera comprising:
   another terminal means provided on the camera for electrical connection to said first-mentioned terminal means on the electroflash unit;
   detection means for detecting said predetermined signal transmitted from the electroflash unit through said terminal means and for generating a detection signal; and
   power supply means for supplying power to said light measuring circuit in accordance with said detection signal.

4. An electroflash unit attachable to a camera having means for measuring light received through a photographing lens thereof, said electroflash unit comprising:
   terminal means for connecting the electroflash unit to the camera;
   means for effecting flash light emission;
   means for terminating said flash light emission;
   means for generating, on said terminal means, a predetermined signal for placing the light measuring means in a state in which it is ready for operation;
   state detection means for detecting that the light measuring means is in a state in which the light measuring means cannot transmit an output to the electroflash unit; and
   warning means responsive to an output from the state detection means for generating a warning signal.

5. An electroflash unit according to claim 4, which further comprises selection means for alternatively selecting a first mode in which flash light emission is terminated in accordance with the output from said light measuring means or a second mode different from said first mode, and wherein said warning means generates the warning signal in accordance with the output from said state detection means when said first mode is selected by said selection means.

6. An electroflash unit according to claim 4, wherein said state detection means detects the absence of power being supplied to said light measuring means.

7. An electroflash unit according to claim 6 wherein said state detection means has an input terminal connected to said terminal means.

8. An electroflash unit according to claim 7, wherein said state decision means and said signal generating means have a common switching transistor which is in turn connected to said terminal means in such manner that said transistor is conductive when the power is being supplied to said light measuring means on the camera and wherein, when said switching transistor is conductive, said state detection means and said signal generating means generate the state detection output and the predetermined signal, respectively.

9. A camera for use with an electroflash unit of the type in which flash light emission can be terminated, comprising:
   means for measuring the light received through a photographing lens of the camera and for generating a measured light output for terminating the flash light emission of the electroflash unit;
   detection means for detecting a state of the electroflash unit in which the electroflash unit can terminate its flash light emission in accordance with the measured light output and for generating a detection output when said state is detected;
   power supply means for supplying power to said light measuring means in accordance with said detection output;
   means for generating an exposure factor signal related to preselected exposure factors; and
   transmission means for transmitting to the electroflash unit said measured light output when the output of said detection means is present or said exposure factor signal when said output of said detection means is absent.

10. A camera according to claim 9 which further comprises a terminal for electrical connection between the electroflash unit and the camera, and wherein said transmission means transmits said measured light output as well as said exposure factor signal through said terminal.

11. A camera for use with an electroflash unit of the type in which flash light emission can be terminated, comprising:
  means for measuring the light received through a photographing lens of the camera and for generating a measured light output for terminating the flash light emission of the electroflash unit;
  detection means for detecting a state of the electroflash unit in which the electroflash unit can terminate its flash light emission in accordance with said measured light output and for generating a detection output when said state is detected;
  means for indicating that the electroflash unit is ready for flash light emission;
  selection means for alternately selecting a mechanical mode in which shutter time is controlled mechanically or an electrical mode in which shutter time is controlled electrically; and
  means for rendering inactive said indicating means when the mechanical mode is selected by said selection means and the shutter time is mechanically controlled to a higher speed than flash synchronous time.

12. A camera for use with an electroflash unit of the type in which flash light emission can be terminated, comprising:
  means for measuring the light received through a photographing lens of the camera and for generating a measured light output for terminating the flash light emission of the electroflash unit, the light measuring means including a photoelectric element, an integrating circuit for integrating the current related to the incident light on said photoelectric element, a temperature compensated reference voltage source for generating a constant voltage output, and a comparing circuit for comparing an output from the integrating circuit with the output from the reference voltage source and for generating said measured light output when the compared outputs have a predetermined relationship;
  detection means for detecting a state of the electroflash unit in which the electroflash unit can terminate its flash light emission in accordance with said measured light output and for generating a detection output when said state is detected;
  power supply means for supplying power to said light measuring circuit in accordance with said detection output; and
  source voltage checking means for comparing a voltage output of the power supply means with the output of said reference voltage source.

13. An electroflash unit attachable to a camera, comprising:
  circuit means;
  a power source for supplying power to the circuit means,
  detection means for detecting that power is being supplied to the camera and for generating a detection output in response thereto; and
  power supply control means for enabling said power source to supply power to said circuit means and for inhibiting the supply of power from said power source in response to the disappearance of said detection output, said power supply control means including switching means connected between the power source and the circuit means for enabling the power source to supply power to said circuit means when said switching means is actuated, operation means for receiving the detection output from said detection means and for actuating said switching means during the reception of said detection output, and means for generating a time output for a predetermined period of time after the disappearance of said detection output during which said switching means is actuated independently of said operation means.

14. An electroflash unit attachable to a camera, comprising:
  circuit means,
  a power source for supplying power to the circuit means;
  detection means for detecting that power is being supplied to the camera and for generating a detection output in response thereto;
  power supply control means for enabling said power source to supply power to said circuit means and for inhibiting the supply of power from said power source in response to the disappearance of said detection output, said power supply control means including switching means connected between said power source and said circuit means for enabling the power source to supply power to said circuit means when said switching means is actuated, and operation means for receiving the detection output from said detection means and for actuating said switching means during the reception of said detection output;
  power supply means for enabling said power source to supply power to said circuit means independently of said detection output when said power supply means is actuated;
  selective switching means for selectively setting said power supply means and said power supply control means to an operating state; and
  time output generating means for generating a time output for a predetermined period of time after setting of said power supply control means to the operating state by said selective setting means for actuating said switching means independently of said operation means.

15. An electroflash unit according to claim 14, wherein said time output generating means generates another time output for a predetermined period of time after the disappearance of said detection output for actuating said switching means independently of said operation means.

16. An electroflash unit attachable to a camera having means for measuring light received through a photographing lens thereof, said electroflash unit comprising:
  a plurality of terminals for connection to the camera;
  means for effecting flash light emission;
  means for terminating said flash light emission in accordance with an output from said light measuring means;
  means for generating, on at least one of said terminals, a predetermined signal for transmission to the camera by which said light measuring means is placed into an operational state;
  signal detection means for detecting a signal transmitted from the camera through the same terminal as said predetermined signal; and
  means responsive to the detection of said signal by the signal detection means for supplying power to the electroflash unit.

17. An electroflash unit attachable to a camera having a camera power source, said electroflash unit comprising:
an electroflash unit power source;
circuit means;
detection means for detecting whether power from the camera power source is being supplied to the camera and for generating a detection output; and
power supply control means, including a manually operable member capable of assuming first, second and third conditions for inhibiting the supply of power from said electroflash unit power source to said circuit means irrespective of said detection output when said manually operable member assumes said first condition, for allowing the supply of power to said circuit means irrespective of said detection output when said manually operable member assumes said second condition, and for allowing the supply of power to said circuit means in response to said detection output when power from the camera power source is being supplied to the camera and said manually operable member assumes the third condition.

18. An electroflash unit according to claim 17, wherein said power supply control means allows the supply of power to said circuit means for a predetermined period when said manually operable member assumes said third condition and the power from the camera power source is not being supplied to the camera.

19. An electroflash unit according to claim 17, wherein said power supply control means allows the supply of power to said circuit means for a predetermined period after interruption of the power supplied from the camera power source to the camera when said manually operable member assumes said third condition.

20. A camera for use with an electroflash unit in which flash light emission can be terminated in accordance with an output from the camera, said camera comprising:
means for measuring light received through a photographing lens of the camera and for producing an output for terminating the flash light emission of the electroflash unit;
detection means for detecting a state of the electroflash unit in which flash light emission can be terminated in accordance with said output of said light measuring means and for generating a detection output when said state is detected;
exposure factor means for generating an exposure factor signal related to film sensitivity and/or diaphragm aperture; and
transmission means for transmitting to the electroflash unit said output from said light measuring means when the detection output is present or for transmitting said exposure factor signal when the detection output is absent.

21. A camera system including a camera body and an electroflash unit attachable to the camera body, said camera system comprising:
first means provided in the camera body for generating first and second signals;
second means provided in the electroflash unit for generating a third signal;
third means provided in the electroflash unit for generating a warning signal in response to each one of said first, second and third signals; and
fourth means provided in the camera body for providing a warning indication in response to said warning signal.

22. A camera system according to claim 21, wherein the camera can assume a first mode suitable for flash light photography and a second mode unsuitable for flash light photography, and wherein
said first means includes means for measuring light received through a photographing lens and for generating said first signal in response to said measured light, and means for setting an exposure factor and for generating said second signal in response to said set exposure factor, and
said second means detects which mode the camera assumes and generates said third signal when the camera assumes said second mode.

23. A camera system according to claim 22, wherein the electroflash unit includes means for receiving at least one of said first and second signals and for detecting whether said received signal indicates suitability for flash light photography and for generating an output when said signal indicates unsuitability for flash light photography, and said third means generates the warning signal according to said output.

24. An electroflash apparatus attachable to a camera having means for measuring light received through a photographing lens thereof, said electroflash apparatus comprising:
a plurality of terminals for connecting the electroflash apparatus to the camera;
means for effecting flash light emission;
means for terminating said flash light emission in accordance with an output from said light measuring means; and
signal generating means for receiving a camera signal transmitted from the camera through at least one of said terminals and for generating, on the same terminal as said camera signal, a predetermined signal for placing the light measuring means in a state in which it is ready for operation during at least reception of said camera signal, the form of said predetermined signal being different from that of said camera signal.

25. An electroflash apparatus according to claim 24, wherein said predetermined signal is in a form of voltage, said camera signal is in a form of current and said signal generating means generates said predetermined signal only during reception of said camera signal.

26. An electroflash apparatus according to claim 24, further comprising a circuit, and wherein said signal generating means generates, in response to said camera signal, both said predetermined signal and a further signal for controlling said circuit.

27. An electroflash apparatus according to claim 26, wherein said predetermined signal is in a form of voltage, and said camera signal is in a form of current.

28. An electroflash apparatus according to claim 27, wherein said signal generating means includes a transistor whose base terminal is connected to said one terminal, said transistor being rendered conductive during reception of said camera signal to keep said one terminal at a predetermined constant potential which serves as said predetermined signal.

* * * * *